US008456128B2

(12) United States Patent
Fotherby

(10) Patent No.: US 8,456,128 B2
(45) Date of Patent: Jun. 4, 2013

(54) MULTI OUTPUT INVERTER

(75) Inventor: Christopher William Fotherby, Manukau (NZ)

(73) Assignee: Power Concepts NZ Limited, Manukau (NZ)

( * ) Notice: Subject to any disclaimer, the term of this patent is extended or adjusted under 35 U.S.C. 154(b) by 338 days.

(21) Appl. No.: 12/667,773

(22) PCT Filed: Jun. 13, 2008

(86) PCT No.: PCT/NZ2008/000140
§ 371 (c)(1),
(2), (4) Date: Mar. 30, 2010

(87) PCT Pub. No.: WO2009/008742
PCT Pub. Date: Jan. 15, 2009

(65) Prior Publication Data
US 2010/0320949 A1    Dec. 23, 2010

(30) Foreign Application Priority Data

Jul. 9, 2007   (NZ) ........................................ 556441

(51) Int. Cl.
*H02P 27/04*       (2006.01)
(52) U.S. Cl.
USPC ............................. 318/800; 318/106; 318/812
(58) Field of Classification Search
USPC ... 318/800, 812, 34–43, 106; 363/71; 307/64, 307/66; 62/228.3
See application file for complete search history.

(56) References Cited

U.S. PATENT DOCUMENTS

| | | | | |
|---|---|---|---|---|
| 4,364,109 A | * | 12/1982 | Okado et al. | 363/41 |
| 5,402,053 A | | 3/1995 | Divan et al. | |
| 5,670,851 A | * | 9/1997 | Numazaki | 318/106 |
| 5,682,303 A | * | 10/1997 | Goad | 363/71 |
| 5,691,625 A | * | 11/1997 | Kumar et al. | 322/20 |
| 5,745,356 A | * | 4/1998 | Tassitino et al. | 363/71 |
| 6,058,032 A | * | 5/2000 | Yamanaka et al. | 363/71 |
| 6,307,759 B1 | | 10/2001 | Inarida et al. | |
| 6,340,851 B1 | | 1/2002 | Rinaldi et al. | |
| 6,392,905 B1 | | 5/2002 | Huang et al. | |
| 6,469,469 B1 | | 10/2002 | Chambers et al. | |
| 6,486,632 B2 | | 11/2002 | Okushima et al. | |
| 6,622,505 B2 | * | 9/2003 | Anderson et al. | 62/228.3 |
| 6,747,457 B2 | | 6/2004 | Suzuki | |
| 6,836,416 B2 | | 12/2004 | Ishihara et al. | |
| 6,864,646 B2 | | 3/2005 | Rahman et al. | |
| 7,053,569 B2 | | 5/2006 | Takahashi | |
| 7,277,304 B2 | * | 10/2007 | Stancu et al. | 363/71 |
| 7,372,712 B2 | * | 5/2008 | Stancu et al. | 363/71 |
| 7,880,419 B2 | * | 2/2011 | Sihler et al. | 318/504 |
| 2003/0000236 A1 | * | 1/2003 | Anderson et al. | 62/228.3 |
| 2007/0070667 A1 | * | 3/2007 | Stancu et al. | 363/132 |
| 2007/0223262 A1 | * | 9/2007 | Stancu et al. | 363/57 |
| 2009/0146603 A1 | * | 6/2009 | Sihler et al. | 318/812 |

FOREIGN PATENT DOCUMENTS

| | | |
|---|---|---|
| EP | 1662641 | 5/2006 |
| WO | 2005101637 | 10/2005 |

* cited by examiner

*Primary Examiner* — Paul Ip
(74) *Attorney, Agent, or Firm* — Dann, Dorfman, Herrell & Skillman, P.C.

(57) ABSTRACT

The present invention relates to a multi output inverter that is adapted to supply mains powered appliances (47-49) and/or poly-phase motors (50, 51). The inverter is also adapted to reduce ripple current.

9 Claims, 14 Drawing Sheets

MULTI OUTPUT INVERTER

This application is a 371 of PCT/NZ2008/000140 filed on Jun. 13, 2008.

FIELD OF THE INVENTION

This present invention relates to DC to AC inverters for supplying mains power apparatus and/or poly-phase motors.

BACKGROUND TO THE INVENTION

Larger DC to AC inverters are coming into general use. The magnitude of the DC current needed to supply these larger inverters is becoming problematic. In vessels there are many motor driven pieces of equipment that could be advantageously driven by motor speed controllers, but the use of dedicated motor speed controllers has been restricted by cost.

An inverter producing 50 or 60 Hz sine-wave mains power will draw current from its DC supply in the form of a sine squared waveform with the peaks repeating at a rate of 100 or 120 Hz. Mains power has a mains frequency and voltage that will be known to those skilled in the art. Mains frequency means the frequencies used to transmit AC current from an electrical generator through an AC power transmission network to electrical loads. The frequencies currently in use are 16.7 Hz, 50 Hz, 60 Hz and 400 Hz, but many other frequencies were used in the early days of electrical power generation. In most parts of the world, mains voltage is 115V (at 60 Hz) or 230V (at 50 Hz). For an ideal inverter with no losses, the peak DC current will be twice the average current and the minimum current will be zero. This is equivalent to a DC current flow (equal to the average current) with a large AC current superimposed on it. The peak-to-peak amplitude of the AC component is equal to twice the average current. This AC components is often called ripple current. In practice an inverter will normally contain a reservoir capacitor across its DC supply terminals that will tend to supply some of the ripple current. In most commercially available inverters the reservoir capacitor is not large enough to materially reduce the mains frequency related AC component drawn from the DC supply. When the current draw by an inverter comes from an energy store, the ripple current, in conjunction with the equivalent series resistance (ESR) of the energy store, produces a ripple voltage at the energy store terminals. Ripple voltage can cause a number of problems in other equipment connected to the same energy store. Some audio equipment is susceptible to ripple voltage on its supply connection and will produce audible interference at the ripple frequency. If the ripple voltage is large enough, the voltage dips corresponding to the peaks in the current waveform may be low enough to trip the under-voltage detection function of some electronic equipment, causing the equipment to reset. A DC current with a superimposed ripple current has a higher root mean square (RMS) value than just the DC current by itself. Thus, the heat produced when the combined currents flow through a resistance is greater than when just the DC current flows, even though the average current in both cases is the same. This effect will occur in both the ESR of the energy store and in the resistance of the cables between the energy store and the inverter. At present the lowest cost energy store is one constructed from lead-acid rechargeable batteries. The ripple current from an inverter system influences the chemical reactions that take place inside the cells of a lead-acid battery. A lead-acid cell is constructed with the lead compounds formed into plates, which are surrounded by an acid electrolyte. The electrolyte takes part in the chemical reactions that either generate or store electric current. In order for the lead compounds in the interior of the plates to react, the electrolyte must diffuse through from the outside of the plate. This diffusion process is slow relative to the current changes brought about by the ripple current, which causes the chemical reactions to be concentrated on the outside of the plates whenever the cell charge or discharge current has a large ripple current component. There are various wear-out mechanisms that limit the number of times that the lead compounds can transition between their charged and discharged states, so the tendency for the reactions to occur preferentially in a portion of the lead compounds results in a reduced cell life. Almost all cell chemistries involve reactions between solid active materials and a liquid electrolyte and so are highly likely to show the same kind of reduction in life when subjected to high ripple currents.

It is common for a long term DC energy store suitable for connection to a multi output inverter according to the present invention to be charged from an alternator on the main engine of a vessel or RV. One of the problems associated with these alternators is the generation of a "load dump" transient over-voltage if the energy store is disconnected from the alternator while the alternator is supplying a significant current. A load dump is caused because the alternator charge control circuit is not capable of quickly reducing the current in the field coil that sets the alternator output, so the alternator output voltage rises up towards its maximum open circuit voltage which can be up to six to eight times the nominal system voltage. Many electronic products on the market are not designed to withstand this type of over-voltage event. However, they can be protected if there is a device connected to the DC distribution wiring that is capable of absorbing the excess energy from the alternator until the field coil current has been cut back. This is no simple task because of the large amount of energy involved.

On a boat it is common for equipment to be powered by brushed DC motors which are supplied with current from a battery bank. Examples include bow thrusters, stern thrusters, anchor winches, electric sheet winches, water makers, and refrigeration compressors. This type of motor has many problems, such as the need to regularly maintain and replace the brushes, the size and weight of the supply cables, the high weight of the motor, the high turn on current surge, the high start up acceleration of the motor, the sensitivity to voltage drops, and fixed speed operation.

SUMMARY OF THE INVENTION

It is an object of the invention to provide improvements to an inverter.

In one aspect the present invention may be said to consist in a DC to AC inverter comprising two or more DC to AC converters that provide a plurality of output channels, the inverter adapted to draw a DC input current from a long term DC energy store and generate AC output voltages on the output channels, the AC output voltages having a frequency and amplitude adapted for supplying mains powered apparatus, the DC to AC inverter comprising or adapted to connect to at least one phase controller for independently controlling the phase of the AC output voltages, the phase controller being adapted to receive input indicating the magnitude and phase of the AC current drawn from the output channels, wherein the phase controller is adapted to alter the phase of the AC output voltages on one or more output channels of the DC to AC inverter based on the magnitude and phase of the output current indicated from one or more of the output channels.

Preferably the a DC to AC inverter has two or more of the output channels adapted to connect to one or more poly-phase electric motors and provide output to power the motors, sand wherein the one or more phase controllers are adapted to receive input indicating desired motor rotation, and wherein the one or more phase controllers are adapted to alter the phase and/or frequency and/or voltage and/or waveform of the output on each of the two or more output channels based on desired motor rotation.

Preferably the phase controller is adapted to alter the phase of the AC output voltages on one or more of the output channels of the DC to AC inverter based on the magnitude and phase of the sensed current from one or more of the output channels to reduce ripple current drawn from a long term DC energy store.

Preferably two or more of the output channels are adapted to connect to one or more poly-phase electric motors and provide output to rotate the motors, wherein the one or more phase controllers are adapted to receive input indicating motor rotor position, and wherein the one or more phase controllers are adapted to alter the phase and/or frequency and/or voltage and/or waveform of the output on each of the two or more output channels based on motor rotor position.

Preferably there are at least two phase controllers, wherein the phase controllers are adapted to communicate with each other so as to receive at least input derived from the magnitude and phase of the AC current from the output channels, wherein the phase controllers are adapted to alter the phase of the AC output voltages on one or more output channels of the DC to AC inverter based on the received input.

Preferably the DC to AC inverter comprises the one or more phase controllers in the same enclosure.

Preferably the DC to AC inverter is adapted for connection to a switching network with a plurality of load outputs adapted to connect to one or more loads, the switching network being adapted to be configured to selectively connect one or more of the output channels to one or more of the load outputs.

Preferably the DC to AC inverter further comprises a switching network with a plurality of load outputs adapted to connect to one or more loads, the switching network being adapted to be configured to selectively connect one or more of the output channels to one or more of the load outputs.

Preferably the switching network is configured to selectively connect at least one of the output channels to one or more load outputs of the switching network, the load outputs being for connection to one or more loads and further comprising: wherein for each of one or more original output channels the DC to AC inverter further comprises: one or more first sensors coupled to detect the magnitude of the AC current drawn from the original output channel, wherein when the switching network is configured for connecting the original output channel to one or more loads, the one or more phase controllers being adapted to receive input from the one or more first sensors and upon receiving input indicating a high current being drawn from the original output channel, the one or more phase controllers are adapted to: activate one or more of the other output channels, align the phases of the AC voltage on the one or more other output channels and the original output channel, and operate the switching network into a configuration for connecting the one or more other output channels to one or more loads supplied by the original output channel and disconnecting the load output from the original channel.

Preferably the DC to AC inverter further comprises, for each of one or more of the load outputs of the switching network being supplied by an original output channel, one or more second sensors coupled to detect the AC current magnitude drawn from the load output of the switching network, and upon receiving input indicating a high current being drawn from the load output of the switching network, the one or more phase controllers are adapted to: activate another output channel, align the phases of the AC voltage on the other output channel and the original output channel, and operate the switching network into a configuration for connecting the load output to the other channel and disconnecting the load output from the original channel.

Preferably the switching network is configured to selectively connect at least one of the output channels to one or more load outputs of the switching network, the load outputs being for connection to one or more loads, wherein for each of one or more original output channels the DC to AC inverter further comprises: one or more sensors coupled to detect the magnitude of AC current being drawn from the original output channel, wherein when the switching network is configured for connecting the original output channel to one or more load outputs of the switching network, the one or more phase controllers are adapted to receive input from the one or more sensors and upon receiving input indicating a low current being drawn from the original output channel, the one or more phase controllers are adapted to align the phases of the original output channel and a consolidated output channel and operate the switching network into a configuration to connect the one or more load outputs of the switching network to the consolidated output channel and disconnect the original output channel from the one or more load outputs, the one or more phase controllers being further adapted to shut down the DC to AC converter supplying the original output channel.

In another aspect the present invention may be said to consist in a DC to AC inverter comprising two or more DC to AC converters that provide a plurality of output channels, the inverter adapted to draw a DC input current from a long term DC energy store and generate AC output voltages on the output channels, the AC output voltages having a frequency and amplitude adapted for supplying mains powered apparatus, the DC to AC inverter comprising or adapted to connect to one or more controllers for independently controlling the amplitude and/or frequency and/or waveform of the AC output voltages, wherein two or more of the output channels are adapted to connect to one or more poly-phase electric motors and provide output to rotate the motors, and wherein the one or more controllers are adapted to receive input indicating desired motor rotation, and wherein the one or more controllers are adapted to alter the amplitude and/or frequency and/or waveform of the output on each of the two more output channels based on desired motor rotation.

In another aspect the present invention may be said to consist in a DC to AC inverter comprising two or more DC to AC converters that provide a plurality of output channels, the inverter adapted to draw a DC input current from a long term DC energy store and generate AC output voltages on the output channels, the AC output voltages having a frequency and amplitude adapted for supplying mains powered apparatus, the DC to AC inverter comprising or adapted to connect to one or more controllers for independently controlling the amplitude and/or frequency and/or waveform of the AC output voltages, wherein two or more of the output channels are adapted to connect to one or more poly-phase electric motors and provide output to rotate the motors, and wherein the one or more controllers are adapted to receive input indicating motor rotor position, and wherein the one or more controllers are adapted to alter the amplitude and/or frequency and/or waveform of the output on each of the two more output channels based on motor rotor position.

Preferably the DC to AC inverter is further adapted to drive a poly-phase electric motor coupled to an internal combustion engine so as to start the engine, wherein the poly-phase electric motor is adapted to act as a generator when driven by the internal combustion engine and the DC to AC inverter is adapted to transfer the energy so produced into the long term energy store.

Preferably, in use, the inverter is adapted to transfer one or more phases of a poly-phase electric motor/generator connected to one or more output channel from the one or more output channels to one or more other output channels while the poly-phase electric motor/generator is rotating.

Preferably, in use, when connected to a DC supply, one or more of the output channels are adapted to act as a controller for a free piston Stirling engine generator and transfer power from the Stirling engine via the output channel to the DC supply.

Preferably, in use, the inverter is adapted to transfer a free piston Stirling engine generator connected to a first output channel to a second output channel while the generator is running.

In another aspect the present invention may be said to consist in a DC to AC inverter for installation in a vessel comprising two or more DC to AC converters that provide a plurality of output channels, the inverter adapted to draw a DC input current from a long term DC energy store and generate AC output voltages on the output channels, the AC output voltages having a frequency and amplitude adapted for supplying mains powered apparatus, the DC to AC inverter comprising or adapted to connect to one or more controllers for independently controlling the amplitude and/or frequency and/or waveform of the AC output voltages, wherein two or more of the output channels are adapted to connect to one or more poly-phase electric motors and provide output to rotate the motors, and wherein the one or more controllers are adapted to receive input indicating desired motor rotation, and wherein the one or more controllers are adapted to alter the amplitude and/or frequency and/or waveform of the output on each of the two more output channels based on desired motor rotation.

In another aspect the present invention may be said to consist in a DC to AC inverter for installation in a vessel comprising two or more DC to AC converters that provide a plurality of output channels, the inverter adapted to draw a DC input current from a long term DC energy store and generate AC output voltages on the output channels, the AC output voltages having a frequency and amplitude adapted for supplying mains powered apparatus, the DC to AC inverter comprising or adapted to connect to one or more controllers for independently controlling the amplitude and/or frequency and/or waveform of the AC output voltages, wherein two or more of the output channels are adapted to connect to one or more poly-phase electric motors and provide output to rotate the motors, and wherein the one or more controllers are adapted to receive input indicating motor rotor position, and wherein the one or more controllers are adapted to alter the amplitude and/or frequency and/or waveform of the output on each of the two more output channels based on motor rotor position.

Preferably the DC to AC inverter is adapted to be configured and reconfigured to control either a two phase or a three phase motor or a combination of two phase and three phase motors.

In another aspect the present invention may be said to consist in a DC to AC inverter adapted to be electrically coupled to a long term DC energy store and adapted to draw a DC current from the long term DC energy store and to generate one or more AC output voltages, wherein the inverter comprises means for measuring the equivalent series resistance of the long term DC energy store.

Preferably the means for measuring equivalent series resistance comprises means for injecting an AC current directly or indirectly into conductors connected to the inverter's DC input terminals and means for measuring a resulting AC voltage.

Preferably the DC to AC inverter further comprises means for detecting when the equivalent series resistance of a long term DC energy store connected to the DC to AC inverter increases above a threshold level indicating degradation in the performance of the connected long term DC energy store.

Preferably the DC to AC inverter further comprises: means for detecting when the equivalent series resistance of a long term DC energy store connected to the DC to AC inverter increases above a threshold level that indicates electrical decoupling of the inverter from the energy store, means for shutting down the AC outputs when the threshold level is exceeded.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting

BRIEF DESCRIPTION OF THE DRAWINGS

Preferred embodiments of the invention will be described with reference to the drawings, of which.

DETAILED DESCRIPTION OF THE PREFERRED EMBODIMENTS

The present invention provides a multiple output DC to AC inverter that can dynamically consolidate and split output channels to provide for load requirements (including poly-phase motors) while minimising DC power current demands, and dynamically alter phase/frequency of channels to minimise ripple current.

Figure 1:
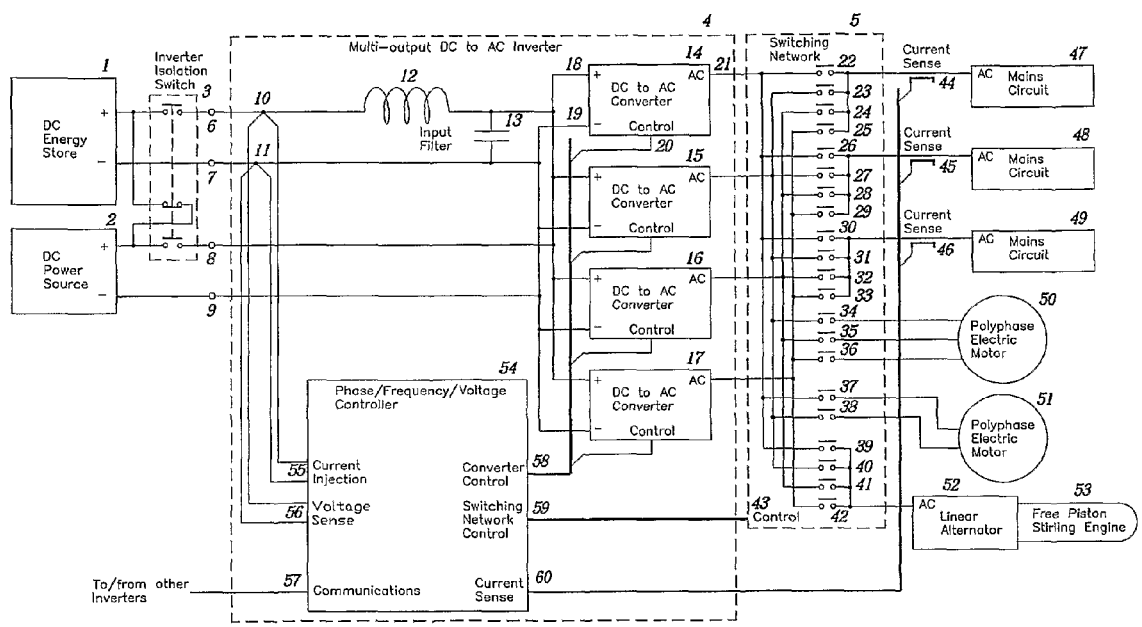
FIG. 1 shows a multi output inverter according to the present invention.

Referring to FIG. 1, a long term DC energy store 1 connects via an inverter isolation switch 3 to the positive input terminal 6 and the negative input terminal 7 of a multi-output DC to AC inverter 4. Conductors inside the inverter connect from the positive and negative input terminals to an input filter consisting of an inductor 12 and a reservoir capacitor 13. The inductor may be connected in series with one of the input conductors as shown or may be split with some inductance in series with the positive conductor and some in series with the negative conductor. All or part of the input filter inductance may be formed from the self inductance of the cables between the long term DC energy store and the inverter.

A long term DC energy store is an energy store able to supply the peak electrical demand of the power system to which it is connected for at least a few minutes. This could be, for example a battery or battery bank, or a bank of super capacitors.

A DC power source 2 connects through contacts in the inverter isolation switch to a positive charging terminal 8 and a negative charging terminal 9. Conductors inside the inverter connect from the positive and negative charging terminals to the input reservoir capacitor 13, allowing the input filter to be used to reduce any ripple current produced by the DC power source before the charging current gets to the long term DC energy store. The contacts in the inverter isolation switch 3 are constructed so that the DC power source can charge the long term DC energy store 1 directly whenever the switch is in the isolated position.

A pair of connection points 10, 11 on the inverter input conductors allow the ESR of the long term DC energy store to be measured by injecting a known AC current at the connection points from the current injection port 55 of the phase/frequency/voltage controller 54 and measuring the resulting AC voltage by use of the voltage sense port 56 of the phase/frequency/voltage controller. One use for this capability is to detect when the inverter is no longer connected to the long term DC energy store so that the DC to AC converters can be rapidly shut down. A rapid shut-down is necessary for safety reasons as an inverter with a low no-load current draw and a large reservoir capacitor would otherwise produce a hazardous output voltage for several tens of seconds after its input has been disconnected. Note that in a practical installation there is likely to be an additional isolation switch located immediately adjacent to the long term DC energy store. A technician servicing the mains voltage wiring is likely to open one of the isolation switches and assume that this will immediately remove any hazardous mains voltages. A second use of this capability is to monitor the ESR of the DC energy source and to provide a warning to the inverter user if ageing of the long term DC energy store has increased its ESR to near the point where the long term DC energy store will no longer be able to supply the peak power draw of the installation.

The terminals of the reservoir capacitor 13 connect to the positive terminals 18 and the negative terminals 19 of four DC to AC converters 14 to 17. Each DC to AC converter has a control port input 20 that connects to the converter control output 58 of the phase/frequency/voltage controller 54. Each DC to AC converter control port is composed of individual signals such as:
  a) pulse width modulated (PWM) signals to control the power switches in the DC to AC converter,
  b) converter heatsink temperature indication,
  c) converter output current indication, and
  d) load dump clamp control.

The AC outputs 21 of the DC to AC converters 14 to 17 connect to a switching network 5 containing switches 22 to 42, which may be either electro-mechanical or semiconductor switches. Also connected to the switching network are AC loads consisting of mains circuits 47 to 49 and poly-phase electric motors 50, 51, plus a source of AC power consisting of a free piston Stirling engine 53, coupled to a linear alternator 52. The return paths for AC current are not shown in the drawing. The switching network 5 has a control port 43 which is connected to the switching network control output port 59 of the phase/frequency/voltage controller 4. The control port allows the phase/frequency/voltage controller to open or close any of the switches 22 to 42, so that for instance:
  a) mains circuit 47 can be switched to receive power from any one of the DC to AC converters 14 to 17 by closing one of the switches 22 to 25, or
  b) DC to AC converters 15 and 16 can be paralleled to supply power to mains circuit 48 by closing switches 27 and 28, or
  c) mains circuits 47 to 49 can be run from DC to AC converter 14 by closing switches 22, 26, and 30 while DC to AC converters 15 to 17 run the poly-phase motor 50 by closing switches 34 to 36.

In effect, the controller allows the DC to AC inverter to be controlled to do any one of the following.
  a) Consolidate channels. That is, switch off one or more channels, and switch the load(s) on those channels to another operating channel. This consolidates two or more loads onto a single channel. This can be done when the single channel can provide sufficient power to the consolidated loads. This is useful to liberate channels (for poly-phase motor control or other mains circuits), and can reduce unnecessary power consumption by allowing one or more channels to be shut down.
  b) Split channels. That is, active one or more output channels, and switch one or more loads from a consolidated channel to the one or more newly activated channels. This can be done where load requirements increase, and the consolidated channel can't provide enough power to meet the requirements of the loads consolidated to that channel. It also allows for reduction of ripple current by distributing the load over several output channels.
  c) Ripple current control. By switching loads to newly activated channels and controlling the voltage phases of those channels, DC input ripple current can be reduced.
  d) Frequency/phase matching. When switching loads to consolidated channels, frequency/phase matching can be done on the separate output channels prior to turning off channels and consolidating the loads on a single channel so that the consolidated loads are operating off the same frequency/phase prior to consolidation.

Current sensing devices 44 to 46 are connected to the current sense port 60 of the phase/frequency/voltage controller 54 to allow the phase/frequency/voltage controller to measure the current flowing to the mains circuits 47 to 49. The phase/frequency/voltage controller uses these currents to determine how it should switch each mains circuit to the appropriate DC to AC converter to best minimise the long term DC energy store ripple current. Having this information also allows the phase/frequency/voltage controller to know when the total AC load is small enough to be supplied from one DC to AC converter without the corresponding ripple current being damaging to the long term DC energy store. When this occurs the phase/frequency/voltage controller will configure the switching network to supply all AC loads from one DC to AC converter and then shut down the unused DC to AC converters in order to conserve the no-load power they would otherwise draw from the long term DC energy store.

The phase/frequency/voltage controller 54 has a communications port 57 for the purpose of synchronising its operations with those of other inverters connected to the same long term DC energy store. This capability may be used to cooperatively control the mains voltage phases of all the inverters linked by their communications port so that the ripple current drawn from the long term DC energy store is significantly reduced below the current that would be drawn if all the DC to AC converters operated in phase with each other. The inverters in a linked system such as this may be multi-output inverters like or similar to the one shown in FIG. 1, or could be single output inverters. A linked system could be composed of any combination of single and multi-output inverters. If a linked system requires that an electrical appliance be able to be transferred from an AC output of one inverter to an AC output of a different inverter, then a separate self-contained switching network would be required. This could be controlled from the inverters via their communications ports.

Figure 2:
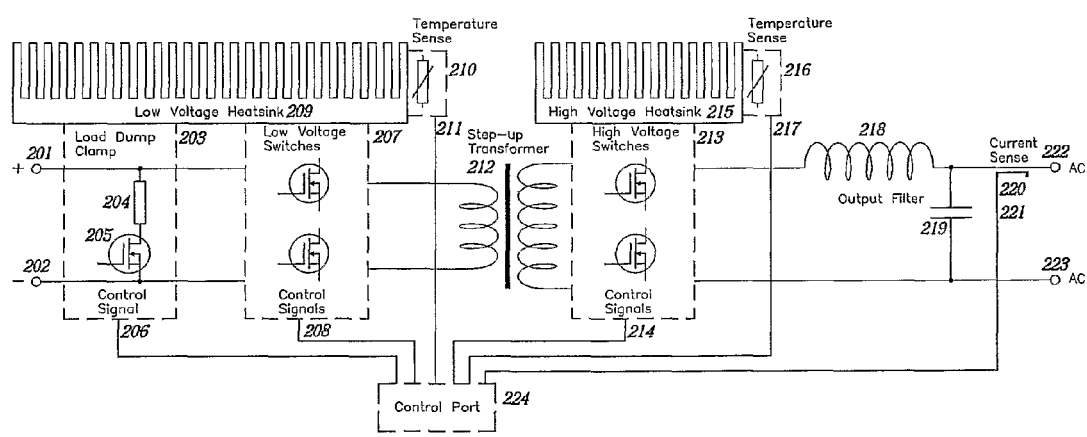
FIG. 2 shows the main functional blocks of the DC to AC converters.

FIG. 2 shows one possible embodiment of a DC to AC converter in block diagram form. This embodiment is of the type where the DC input voltage is first chopped into high frequency square or rectangular pulses by low voltage switches 207 thermally connected to a heatsink 209. The pulses are passed through a high frequency step-up transformer 212 then rectified to high voltage DC. The high voltage is converted to a low frequency sine wave by a process of pulse width modulation using high voltage switches 213 thermally connected to a heatsink 215, followed by filtering from an inductor 218 and capacitor 219 to remove the high frequency components of the pulse width modulation. A current sensor 222 is provided to sense the AC current flowing out the output terminal 222. Terminal 223 is the return terminal for the AC current. Many other inverter embodiments could also be used to perform the DC to AC conversion function.

Referring to FIG. 2, a source of DC power can be connected to the positive DC input terminal 201 and the negative input terminal 202. A load dump clamp circuit 203, consisting of a resistor 204 in series with a semiconductor switch 205, is connected from the positive input terminal to the negative input terminal. The semiconductor switch is shown as a MOSFET, but other types of semiconductor switch could equally well be used. The resistor is thermally connected to the low voltage heatsink 209. A control signal 206 for the semiconductor switch connects to the control port 224, allowing a controller to put the semiconductor switch into its conductive state whenever a load dump transient is detected. The resistance of the resistor can be determined by considering the maximum output current of the alternator that has generated the transient in conjunction with the maximum voltage that can be tolerated between the positive and negative input terminals. The maximum resistance is simply the maximum voltage divided by the maximum current. In a multi-output inverter two or more of the DC to AC converters can contain load dump clamps with the load dump current shared substantially equally between them. An inverter is an ideal location for a load dump clamp because it has low impedance connections to the long term DC energy store and is highly likely to have a heatsink for its switching devices that can serve the dual purpose of dissipating the energy in a load dump transient.

The DC to AC converter is provided with a control port 224 so that a controller can:
 a) switch the load dump clamp on and off via control signal 206, and
 b) switch the low voltage switches on and off via control signals 208, and
 c) sense the low voltage heatsink temperature via sense signal 211, and
 d) switch the high voltage switches on and off via control signals 214, and
 e) sense the high voltage heatsink temperature via sense signal 217, and
 f) sense the AC output current via sense signal 221.

The controller can use the current sense signal both to protect the DC to AC converter from overloads and short circuits of the AC output and as an input into the dynamic phase control algorithm that can significantly reduce the ripple current drawn from the long term DC energy store.

Figure 3:
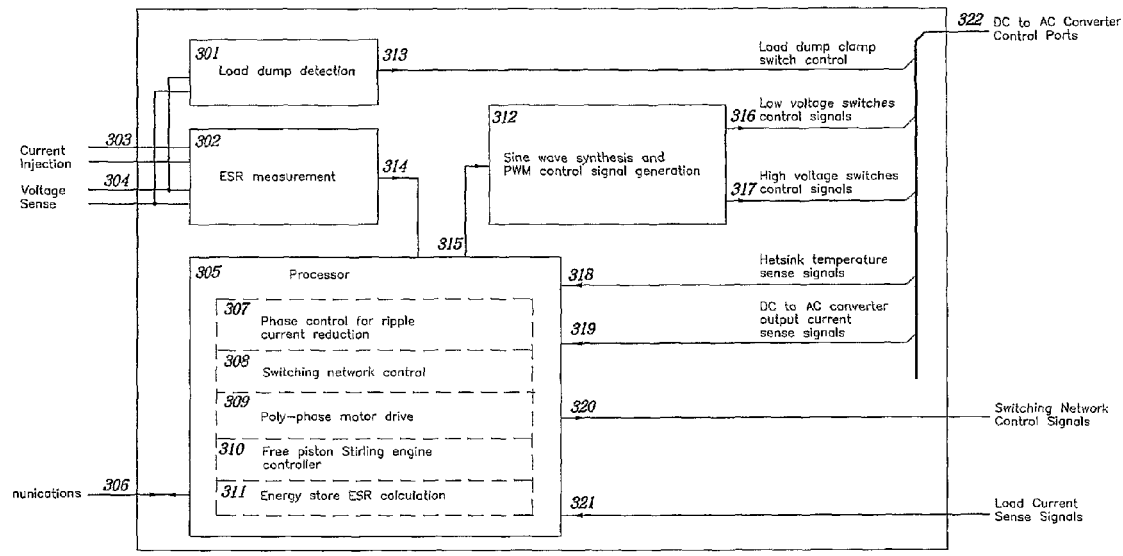
FIG. 3 shows the main functional blocks of the phase/frequency/voltage controller.

FIG. 3 shows a block diagram of one possible embodiment of a phase/frequency/voltage controller adapted to implement a multi output inverter according to the present invention.

A load dump detection circuit 301 monitors the voltage across the voltage sense connections 304 and whenever the monitored voltage is above a pre-defined threshold, turns on the load dump clamps in the DC to AC converters via the load dump clamp switch control 313. An ESR measurement circuit 302 injects an AC current of a pre-defined magnitude into the system's long term DC energy store via current injection connections 303. The resulting AC voltage at the voltage sense connections 304 is processed by applying one or more of the following processes: amplification, rectification, filtering, and/or analog to digital conversion. The processed signal is passed to the processor 305 via connection 314 and is used to calculate the ESR of the long term DC energy store. The injected AC current can have a waveform that is sinusoidal, square, triangular, pseudo-random binary, or any other suitable shape. It may be necessary to select the frequency of the injected current so that it can be differentiated from any currents that are generated by the power conversion process of the DC to AC converters. The preceding description is not the only way that ESR could be measured. For instance, it would also be possible to impress a small AC voltage across the long term DC energy store and calculate the ESR from a measurement of the resulting current. Further, it would be possible to impress either a current or voltage that is not closely controlled by the driving circuit, and measure both the impressed voltage or current and the resulting current or voltage.

A sine wave synthesis and PWM control signal generation block 312 produces a plurality of control signals 316 to drive the low voltage switches in a plurality of DC to AC converters of the type shown in FIG. 2. In like manner the sine wave synthesis and PWM control signal generation block produces a plurality of high voltage switch control signals 317. To simplify the drawings all connections to and from all the DC to AC converters have been shown as a single DC to AC converter control port 322. In practice this may be implemented by separate cables between each DC to AC converter and the phase/frequency/voltage controller. The sine wave synthesis and PWM control signal generation block accepts commands via connection 315 so that the PWM control signals produced set the phase, frequency, and voltage of the AC waveform at the output of each DC to AC converter.

A processor 305 has inputs: 314 for the processed AC voltage from the ESR measurement circuit, 318 for heatsink temperature sense signals from the DC to AC converters, 319 for DC to AC converter output current sense signals, and 321 for load current sense signals. It has outputs: 315 to send commands to the sine wave synthesis and PWM control signal generation block, and 320 to control the switches in the switching network shown in FIG. 1. It has a communications port 306 so that it can synchronise its operation with any other inverters connected to the same long term DC energy store. The processor executes one or more of the following algorithms to implement the various novel features of the present invention a) Phase Control for Ripple Current Reduction A possible algorithm for reducing the ripple current component of the long term DC energy store current is described in the following paragraphs. We will consider an example of an inverter with one consolidated output channel and three other output channels that are started up and shut down to meet the varying power demand presented when appliances are turned on and off. The consolidated output channel runs continuously and its voltage output waveform will be defined as having zero phase shift. Each output channel has a means of measuring the output current it is supplying, which is fast enough to take a number of measurements during each mains frequency cycle. Note that the loads being supplied will not necessarily have unity power factor, so the current each output channel supplies may not be in phase with the voltage waveform being generated by that output channel.

The algorithm starts by taking a number of current readings for each active channel. We will consider the case where all four output channels are supplying power. As the DC current drawn by each of the DC to AC converters in the inverter will have a waveform that repeats twice for every mains cycle period, it is only necessary to take current measurements over a period of half a mains cycle. This is 10 ms for a 50 Hz system and 8.33 ms for a 60 Hz system. We will take as an example a system that uses eight measuring points during this interval. Half of a cycle is 180 degrees, so the spacing between each measuring point is 22.5 degrees. At each of the eight points all four currents are measured as nearly simultaneously as the measurement hardware will allow. It would be possible to start the series of measurements at any point, but it is easier to visualise the process if the first measurement point is taken at a zero voltage crossing of the consolidated output channel. Each current measurement must be multiplied by the output voltage that the appropriate output channel was generating at the instant that the current was measured. Note that each DC to AC converter is generating a defined sinusoidal output voltage, so the necessary voltage values can be calculated and do not need to be measured. The result of each multiplication is the instantaneous power being supplied by the corresponding output channel. Dividing these values by the DC supply voltage gives the components of the DC supply current being drawn by the DC to AC converter of each output channel. Note that for non unity power factor loads the component of the DC supply current can be negative (i.e. back into the long term DC energy store) during some parts of the mains cycle. The 32 DC supply current components are now arranged as an array with a row for each output channel and a column for each of the eight measurement points. If the four current components in a column are added together, the result will be the total DC current being drawn from the long term DC energy store at that measurement point. By repeating this summation for all eight columns it is possible to generate another row of values that represent the total current waveform being drawn from the long term DC energy store.

It is now possible to calculate the total current waveforms that would result if the three outputs other than the consolidated output are shifted in phase. The effect of a phase shift can be simulated by rotating the positions of the entries in a row. If the top row represents the consolidated output, then it does not need to be rotated as the consolidated output voltage waveform always remains fixed at zero phase shift. If the values in the second row are all shifted to the right one place and the rightmost value is "rotated" back to the first column in the row, then this represents a positive phase shift of 22.5 degrees for the corresponding output channel. After this rotation it is possible to add up the four values in each column to find out what the total DC current waveform would be if this phase shift was actually made. This process needs to be repeated for all 512 possible combinations of 22.5 degree phase shifts of the three output channels. If the eight instantaneous current values for each phase shift combination are stored in an array with eight columns and 512 rows, then it is possible to search for the combination that gives the smallest ripple current. One way to perform this operation is to search each row for the maximum current value and to put this value into the same row of a ninth column. The ninth column is then searched to find the row with the smallest value. The phase shift combination that generated this row is the combination that will give the smallest ripple current for phase shift steps of 22.5 degrees. Finding the optimum phase shifts more accurately would require more measurement points and a much larger array.

The phase shift combination found by the above algorithm does not represent the absolute phase shifts that each output channel should be set to. Rather they represent relative values. At the time the measurements are taken each output channel will normally be set to a non-zero phase shift from a previous optimisation. The phase shifts found by the algorithm should be added to the existing phase shifts and each channel should be adjusted until its phase shift is equal to the newly calculated value. An output channel's phase shift can be adjusted by setting its frequency slightly higher or lower than that of the consolidated channel. A higher frequency will produce a phase shift with respect to the consolidated channel that increases linearly with time. If, for instance, it is decided to produce a particular change in phase over 10 mains cycles, then it is possible to calculate the frequency the output channel must be set to in order to achieve this. At the end of the 10 cycles the output channel's frequency would be set back to match that of the consolidated channel. A typical system would determine the optimum phase angles several times each second, with each determination being followed by a phase adjustment period.

The above description sets out one possible way to find the phase shift combination that gives minimum ripple current. There are many other ways that the same algorithm could be implemented. For instance, the optimum phase shift combination could be found by producing a ninth column containing the minimum value from each row and then searching for the maximum value in this ninth column. As another example, the above description is for a variation of the algorithm that searches phase shifts of 0 to 157.5 degrees from the current phase shifts. It would also be possible to do centred searches of −90 to +67.5 degrees about the current phase shifts.

This algorithm has been presented in the above form to demonstrate the concept. It is unlikely to be implemented in software in the same form. Those skilled in the art of computer programming would be able to implement the same algorithm in a different form that, for instance, would require much less memory and would not have to actually rotate the values in a row of an array. Based on this algorithm, ripple current can be determined along with how to minimise ripple current. Channels can be consolidated, split and/or phases adjusted according to the algorithm outcomes to minimise ripple current.

This algorithm is just one example of how the optimum phase shift combination could be found. It is not intended that the invention covered by this specification be limited to just using the described algorithm.

It is instructive to consider the improvements offered by a dynamic phase adjustable power system over prior art inverter power systems. One prior art system would have a single output inverter to supply all the loads, or an equivalent system of several single output inverters connected with their outputs in parallel and all running in phase with each other. A second prior art system would have a three output inverter or three separate single output inverters with each output having a fixed 120 degree phase difference from the previous one. Consider a power system with a 24 VDC long term energy store supplying three unity power factor loads, one of 3 kW and two of 1.5 kW. The single phase prior art system would have a long term DC energy store ripple current of 500 A peak to peak. The three phase prior art system would have a long term DC energy store ripple current of 250 A peak to peak. A dynamic phase adjustable system according to the present embodiment described would have zero long term DC energy store ripple current.

Figure 5:
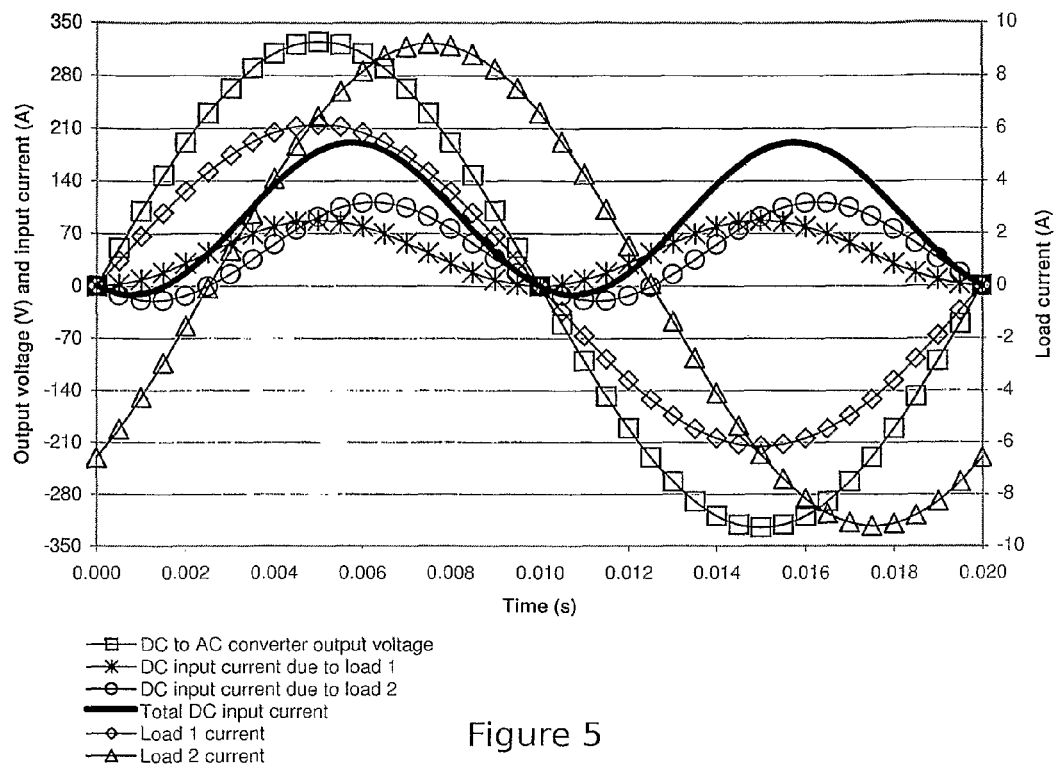
FIGS. 5 and 6 show graphs of ripple current for various load/inverter configurations.
Figure 6:
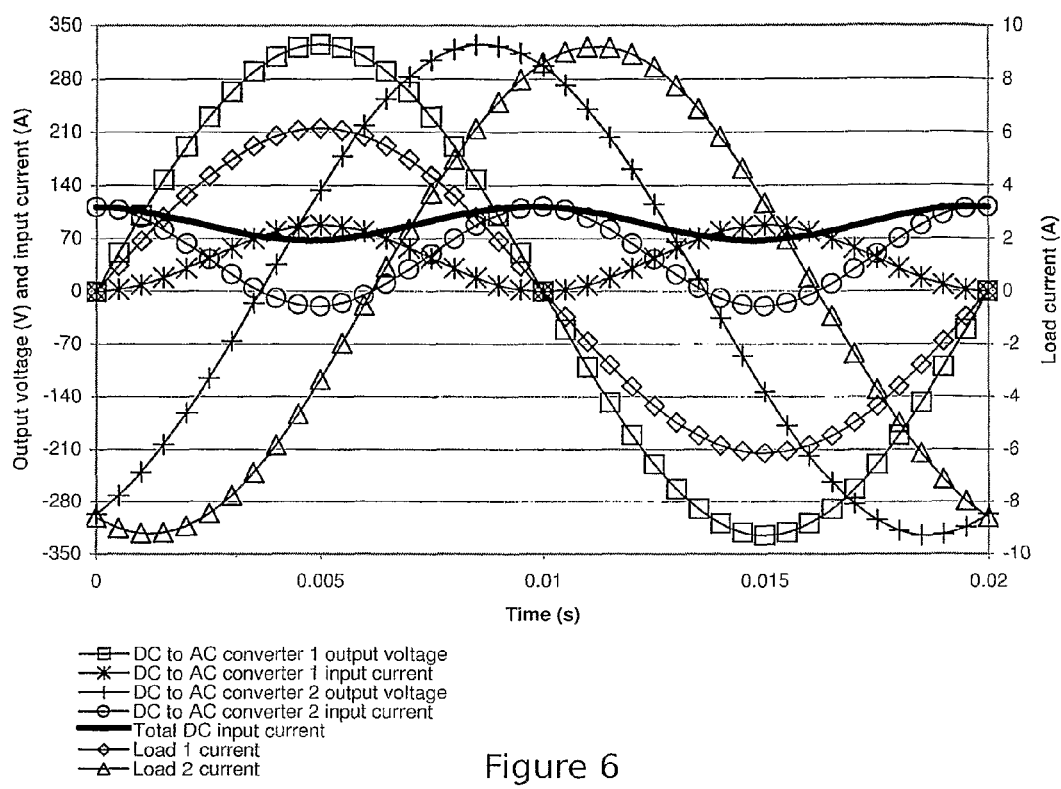

A further example of how output channel consolidation and phase adjustment can reduce ripple current is described here with respect to FIGS. 5, 6. Together, these Figures demonstrate the advantage gained by adjusting the relative output phases of a multiple output DC to AC inverter in order to reduce the DC input ripple current. The graphs presented in the two Figures illustrate the voltages produced and the currents that flow when two 230V 50 Hz loads are driven by a 24 VDC to 230 VAC inverter. Load 1 dissipates 1000 W from a 230 Vrms 50 Hz supply and has a power factor of 1.00. Load 2 dissipates 1050 W from a 230 Vrms 50 Hz supply and has a power factor of 0.70. The DC to AC converter efficiency is assumed to be 95%. The graphs show the voltages and currents over a 0.02 second period, which is one cycle or 360 degrees of a 50 Hz waveform. The voltages and currents for every preceding and subsequent cycle will be identical.

The graph in FIG. 5 shows the total current drawn from the 24 VDC supply if both loads are connected to an inverter constructed with only one DC to AC converter, or constructed with two DC to AC converters configured so that their AC output voltages are in phase with each other. Under these conditions the minimum DC input current is −10.4 A and the maximum is 190.3 A. This gives a peak to peak ripple current of 200.7 A.

The graph in FIG. 6 demonstrates what happens if the inverter is constructed with two DC to AC converters (as per the present invention) so that each load is connected to a separate converter and the relative phase of the converter output voltages is adjusted to minimise the DC input current ripple. If load 1 is connected to converter 1 and load 2 is connected to converter 2, then a minimum ripple current condition exists when the output voltage of converter 2 is delayed by 65.72 degrees with respect to the output voltage of converter 1. Under these conditions the minimum total input current is 68.1 A and the maximum is 111.8 A. This gives a peak to peak ripple current of 43.7 A, which is only 22% of the value in the non phase adjusted case.

b) Switching Network Control

The switching network control algorithm is used to transfer loads from one DC to AC converter to another without interrupting the supply of power to the load.

A first example of where this capability can be used to advantage in the power system disclosed in this specification is the need to provide continuous power to mains appliances that have a standby function and/or electronic controls. A prime example of such an appliance is a microwave oven. Appliances of this type typically draw a very small amount of power when they are in standby mode, and a much larger amount of power when they are being used. When none of the appliances in a system are drawing any significant power the switching network control algorithm can elect to supply them all from a single DC to AC converter (termed the consolidated output) and to shut the other converters down. This conserves energy as each active DC to AC converter will draw some level of idle power even when it is supplying no output power. If subsequently two or more appliances start drawing significant amounts of power, it will be worthwhile for the switching network control algorithm to transfer one or more of the appliances to one or more other converters and to start the dynamic phase adjustment process. It may not be practical for every appliance in an installation to have its own set of switches. It is more likely that a power system would be configured with a number of mains circuits, each fed from a set of switches that control which DC to AC converter supplies power to the circuit. A number of appliances could be connected to each mains circuit as long as the total load when all the appliances are operating is less than the rated power output of the DC to AC converters.

A simple algorithm to determine when to start the dynamic phase adjustment process would be to wait until the power being drawn from the consolidated output exceeds some threshold and then to start up all the other converters and transfer each mains circuit to a pre-assigned converter. This algorithm does not require that each mains circuit have a current sensor. The current sensors built into the DC to AC converters provide sufficient information.

A more complex algorithm would measure the power being drawn by each mains circuit and would only start up enough converters to supply the circuits drawing significant amounts of power.

Whatever method is used to decide when to start using DC to AC converters other than the consolidated output, the switching network control algorithm needs to ensure that each converter is powered up in phase with the consolidated output before the selected circuit(s) are transferred from the consolidated output to the output of a different converter. It is important that the switching operation is performed while the two converter outputs are in phase with each other as some electric motors and some electronic equipment are not designed to handle abrupt changes of phase. To ensure a transfer without even a momentary interruption of power, the switching network control algorithm can connect the mains circuit to the newly started converter before it breaks the connection to the consolidated output. After the switching operation has been completed the newly started converter can participate in the dynamic phase adjustment process.

If the power being supplied by a converter falls below some threshold, the advantage of having the converter participate in the dynamic phase adjustment process is lost. When this occurs the switching network control algorithm can transfer the mains circuit connected to that converter back to the consolidated output. It is likely that the converter being shut down will not be in phase with the consolidated output. In one option its phase can first be adjusted until the two are in phase.

At this point the switch positions can be reversed and the now unloaded converter shut down.

A second example of the use of the switching network control algorithm is to prevent the DC to AC converters from being overloaded when many appliances are being used at the same time. There are some mains appliances that do not require a continuous supply of power. Examples include hot water cylinder elements and air-conditioning compressors. These can be considered to be low priority loads. If the power drawn by all the appliances connected to a DC to AC converter exceeds the rated power of the converter then the switching control algorithm can switch off the power to any low priority loads connected to that converter. This is a case where a mains appliance needs its own set of switches and cannot be connected to a common mains circuit along with other appliances.

A third example of the use of the switching network control algorithm is to allocate a number of DC to AC converters to drive a poly-phase electric motor. At least two and more commonly three converters are required to drive a motor. Before the switching network control algorithm can connect the motor to the allocated converters it must first transfer any mains circuits connected to these converters to other converters that will continue to output the nominal mains voltage and frequency.

A fourth example of the use of the switching network control algorithm is to allocate a DC to AC converter for the purpose of starting or stopping a free piston Stirling engine generator. As the voltage and frequency required by the generator when it is being started or stopped may be outside the allowable limits for mains appliances, any mains circuits connected to the allocated converter must first be transferred to other converters.

A fifth example of the use of the switching network control algorithm is to connect the outputs of two or more DC to AC converters in parallel in order to power an electrical load that is larger than the maximum power rating of a single converter.

A sixth example of the use of the switching network control algorithm is to allocate a DC to AC converter for the purpose of soft-starting a single phase electric motor, such as the motor in an air-conditioning compressor. A single phase electric motor can be soft-started by progressively ramping up the voltage and optionally the frequency of the output of the DC to AC converter the motor is connected to. The surge current the motor will draw when soft-started will be much lower than it would be if the motor was started by connecting it to a converter that was already producing the nominal mains voltage and frequency. As the voltage and frequency produced by the allocated converter while it is starting the motor are outside the allowable limits for mains appliances, any mains circuits connected to the allocated converter must first be transferred to other converters. Once the motor has been started it is possible to transfer some or all of the mains circuits back to the allocated converter.

As an example of splitting and consolidating loads between channels, consider a system where a multi-output inverter is supplying loads comprising a computer drawing 150 W, a TV drawing 100 W, an oven drawing 1.5 kW, a 1 kW electric toaster currently turned off, and a microwave oven currently drawing 1 W. All these loads are initially being supplied by a first channel with a continuous power rating of 3 kW and a surge power rating of 6 kW for 5 seconds. If the microwave oven is used to cook something its power consumption will increase to 2 kW, bringing the total power draw from the first channel to 4.25 kW. This is more than the continuous power rating of the first channel and the inverter controller must start up a second channel and transfer one or more of the loads to it within 5 seconds. The total power draw has also reached the level where it is beneficial to split the loads over two channels and adjust their phases to reduce the ripple current drawn from the DC supply. The inverter controller might, for example, decide to transfer the microwave oven to the second channel. This would leave enough spare capacity in the first channel to supply the toaster if it is turned on. The inverter controller preferably will transfer the microwave oven without producing any glitches in the power supplied to the microwave oven, which might reset the controller in the microwave oven and terminate the cooking operation.

The transfer starts with the inverter controller starting up the second channel with the same voltage and phase settings as the first channel. The inverter controller then closes the switch linking the second channel to the microwave oven circuit so that the microwave oven is now being supplied by both channels. After this switch has been closed the inverter controller is able to open the switch between the first channel and the microwave oven circuit. The microwave oven is now being supplied entirely from the second channel and the inverter controller is able to adjust the phase of the second channel in order to reduce the ripple current drawn from the long term DC energy store. When the microwave oven completes its cooking operation its power consumption will drop back to 1 W. The inverter controller is continuously monitoring the power being supplied by each channel, so is able to see that it is no longer advantageous to be running the second channel. To transfer the microwave oven back to the first channel the inverter controller will first bring the second channel to the same phase and voltage as the first channel. It can then close the switch between the microwave oven circuit and the first channel and follow this by opening the switch between the microwave oven circuit and the second channel. Once the microwave oven has been safely transferred to the first channel the second channel can be shut down.

c) Poly-Phase Electric Motor Controller Overview

The poly-phase electric motor controller algorithm is designed to generate the voltage and/or current waveforms required to drive poly-phase electric motors. These are motors that have multiple windings on the stator which are designed to produce a rotating magnetic field when each winding is connected to a source of AC power with a defined phase difference with respect to the sources connected to the other windings. Most commonly three windings are used, connected to three sources with phase shifts of 120° from one source to the next. However, it is possible to use two windings with a phase shift of 90° between sources, or more than three windings with appropriate phase shifts. This stator construction is used for induction motors, wound rotor synchronous motors, and permanent magnet synchronous motors. Permanent magnet synchronous motors are sometimes called permanent magnet AC motors or brushless DC motors.

In order for the inverter to be used to drive a poly-phase electric motor, the motor controller algorithm must first transfer all mains appliances from the AC outputs that are going to be used to drive the motor, to other AC outputs. To do this the motor speed controller algorithm can make use of the switching network control algorithm described above. Once the selected motor drive outputs are no longer powering any mains appliances, the motor speed controller algorithm is free to set the voltage, frequency, and waveform of these outputs to values suitable for driving the motor. It is possible that the waveform best suited to drive the motor is different from the sinusoidal shape specified for mains power systems, and the waveform's voltage and frequency will often be outside the acceptable values for a mains appliance.

There are many techniques well known in the art for determining the frequency and voltage of the poly-phase AC voltages required to drive a poly-phase electric motor. The techniques can be broadly divided into open loop and closed loop techniques. The closed loop techniques require that the controller generates suitable motor drive waveforms based on a knowledge of the angular position of the motor's rotor. In the open loop techniques the motor controller has no direct knowledge of the rotor position and generates motor drive waveforms at a fixed or relatively slowly changing frequency which defines the rate at which the field produced by the motor stator rotates. In an induction motor the rotor generally rotates at a rate just slightly less than the stator field, the exact amount less being determined by the mechanical load placed on the motor. In synchronous motors the rotor rotates at the same speed as the stator field unless the mechanical load placed on the motor exceeds the maximum torque that the motor can generate. Techniques used for open loop control range from the simple V/F (constant voltage-frequency ratio) technique suitable for applications where the motor speed changes slowly, to more complex vector techniques that can produce more rapid changes in motor speed and even control the motor shaft angular position. The technique selected will depend on the application the motor is being used in.

For example, if a multi output inverter as disclosed in this specification is used in a recreational power boat, then two out of many possible applications for electric motors are in a bow thruster and in a scuba compressor. In both cases the speed of the electric motor only needs to change slowly, so a V/F technique could be used to set the voltage and frequency of the AC outputs. For the bow thruster the motor speed controller could be used to set the speed and direction of the motor so as to vary the amount of thrust produced. It could also control the rate of change of speed to limit the resulting surge current to some acceptable value. The motor in a scuba compressor only needs to turn in one direction. Prior art compressors are run at a substantially fixed speed. When the scuba compressor is started the motor speed controller algorithm can be used to slowly ramp up the motor speed so that the resulting surge current is limited to some acceptable value. If the multi output inverter is installed in a small power boat that does not have a large enough long term DC energy store to run the scuba compressor for the length of time required to fill a scuba tank, then the boat's engine will have to be run while the tank is being filled and the necessary power drawn from the engine's alternator. Many of these alternators are not designed to be run at their rated output current for extended periods of time. For the case where power from the alternator is being used to run a scuba compressor it is desirable that the motor speed controller algorithm set the speed of the compressor motor so that the current drawn from the alternator is limited to some safe maximum value. The compressor could then be run at a high speed at the start of the fill when the pressure in the scuba tank is low, and the speed progressively reduced as the fill progressed and the energy required for each compression cycle increases. Running the compressor at substantially constant power like this is likely to give a faster fill than running at a fixed speed set so that the alternator current is below some safe value at the end of the fill.

As all poly-phase electric motors are also able to act as generators, if the inverter is connected to a genset consisting of a diesel or petrol engine connected to a poly-phase electric motor/generator then it is possible to use the poly-phase electric motor controller algorithm to start the diesel or petrol engine. Thus the genset would not need to be fitted with a conventional starter motor or connected to a starting battery. Once the genset is running it will generate power which will pass "backwards" through the DC to AC converters in the inverter and charge the long term DC energy store. If the genset is run at a speed that produces the nominal mains frequency for the installation, then the DC to AC converters connected to the genset must also be set to this frequency, and it will be possible to simultaneously connect mains appliances to these DC to AC converters. While the genset is running it may be desirable to transfer one or more of its phases to other of the DC to AC converters.

An example of when this could be beneficial is when one of the other outputs is heavily loaded. Switching one of the genset phases to the heavily loaded output would allow the generated power to be used directly and eliminate the losses incurred from first passing through a conversion stage from AC to DC and then through another conversion stage from DC to AC. In order to switch one of the genset phases from one DC to AC converter to another, the poly-phase electric motor controller algorithm must first bring the converters into phase with each other and make sure that they are both set to generate the same output voltage. Once these conditions have been established the switching network can be used to transfer the genset phase. After the transfer the control of the DC to AC converter phases can be handed back to the ripple current reduction algorithm.

Where a number of DC to AC converters are being used to connect to a genset they must have a fixed phase difference between them, such as 90° for a two phase motor/generator or 120° for a three phase motor/generator. This prevents these converters from being used by the ripple current reduction algorithm, which must use just the remaining converters to achieve as much reduction as possible.

d) Free Piston Stirling Engine (FPSE) Controller

In a FPSE generator the engine is directly connected to a linear permanent magnet alternator which produces a sinusoidal AC output voltage, commonly at either 115 Vrms or 230 Vrms. The power output of the engine can be controlled by altering the piston stroke. An effective way to do this is to control the magnitude and/or phase and/or frequency of the current being drawn from the linear alternator. If the DC to AC converters used in a multi output inverter as disclosed in this specification are capable of transferring power in both directions it is possible to use one of the converters as a controller for a FPSE generator. In this application power would be transferred from the generator into the long term DC energy store.

In a typical installation the FPSE control algorithm would start the generator when the long term DC energy store reached a pre-determined level of discharge, and would stop it when the long term DC energy store was fully charged or close to fully charged. During the start-up and shut-down of the FPSE generator the controlling DC to AC converter may have to generate voltages and/or frequencies that are outside the allowable limits for mains appliances. As a consequence of this, at start-up the FPSE control algorithm must ensure that there are no mains appliances connected to the DC to AC converter being used for the FPSE generator. It can do this by making use of the switching network control algorithm described above. During start-up the DC to AC converter feeds power into the linear alternator which works as a linear motor to start the pistons in the FPSE oscillating. Once the FPSE is running it will generate power which will pass "backwards" through the DC to AC converter and charge the long term DC energy store. The FPSE control algorithm is able to control the amount of power generated by making small changes to the frequency and/or voltage of the DC to AC converter connected to the FPSE generator. A wide range of power output is possible with frequencies and voltages that are within the allowable limits for mains appliances, so it is possible to connect mains appliances to the same DC to AC converter as the FPSE generator once the generator is running.

In order for the phase control for ripple current reduction algorithm to continue to function it is desirable for all the DC to AC converters to run at the same frequency as the one connected to the FPSE generator. While the FPSE generator is running it may be desirable to transfer it to one of the other DC to AC converters. An example of when this could be beneficial is when one of the other outputs is heavily loaded. Switching the generator to the heavily loaded output would allow the generated power to be used directly and eliminate the losses incurred from first passing through a conversion stage from AC to DC and then through another conversion stage from DC to AC. In order to switch the FPSE generator from one DC to AC converter to another, the FPSE control algorithm must first bring the converters into phase with each other and make sure that they are both set to generate the output voltage required by the FPSE generator. Once these conditions have been established the switching network can be used to transfer the FPSE generator. After the transfer the control of the DC to AC converter phases can be handed back to the ripple current reduction algorithm.

When the FPSE generator is being stopped the voltages and frequencies it requires may again be outside the allowable limits for mains appliances. Any loads connected to the same DC to AC converter as the generator must first be transferred to other converters before the process to stop the generator can be initiated. Alternatively, the generator could first be switched to an unused converter.

e) Long Term DC Energy Store Equivalent Series Resistance (ESR) Calculation

The ESR measurement circuit 302 detailed at the start of this section describing FIG. 3 will present to the processor a measured voltage corresponding to a defined driving current, or a measured current corresponding to a defined driving voltage, or measured voltage and current values where the driving circuit produces neither a defined voltage nor a defined current. The long term DC energy store ESR calculation algorithm has to simply divide the voltage value by the current value to calculate the ESR. The algorithm uses the ESR value to determine whether the inverter has been disconnected from the long term DC energy store. It also uses the ESR value to monitor the long term DC energy store for degradation in its performance due to ageing.

The need to monitor for disconnection from the long term DC energy store comes about if the inverter has a low idling power and a large DC reservoir capacitor. If no or very little power is being drawn from the AC outputs, then the inverter can continue to produce its full AC output voltage for some considerable time after being disconnected from the long term DC energy store. A person working on the AC wiring is likely to believe that the AC voltage would stop being produced as soon as the DC supply is turned off, and would receive a potentially fatal electric shock if they touched an AC wiring connection. As an example, consider a large 24 VDC inverter with an 880,000 micro Farad reservoir capacitor. If the long term DC energy store is being charged, then the capacitor voltage could be as high as 29 Volts when the inverter's DC supply is turned off. The inverter will continue to produce its full AC output voltage until it shuts itself down when the capacitor has discharged down to a preset minimum inverter operating voltage. A typical minimum would be 21 Volts. If the inverter only consumed 6 Watts from its DC supply when there is no AC load, then it would continue to produce its full AC output voltage for 30 seconds after the DC supply is turned off. In a multi output inverter of the type disclosed in this specification the long term DC energy store ESR calculation algorithm will see a significant increase in the measured ESR value when the inverter is disconnected from the long term DC energy store and will immediately shut down all the DC to AC converters.

The lowest cost long term DC energy store can presently be constructed from a bank of lead acid batteries. Even when a lead acid battery is used as intended by its manufacturer the effect of various wear-out mechanisms gradually degrades its performance. Some of these mechanisms are: positive plate corrosion, shedding of active material from the plates, and the build-up of insoluble sulphates. All of these reduce the amount of energy that the battery can store and the peak current that it is capable of supplying. They will also increase the ESR of the battery. All the batteries in a battery bank will tend to age at a similar rate, so the ESR of a battery bank will increase at the same rate as the ESR of a single battery. If a multi output inverter of the type disclosed in this specification monitors the ESR of its associated battery bank, then this increase can be used to monitor the performance of the battery bank and to generate a warning before the point where the degradation in performance prevents the battery bank from supplying the peak electrical demand of the system. Batteries using other chemistries and other DC energy storage devices will have different wear-out mechanisms, but it is highly likely that they will show an increase in ESR with age, which will allow their performance to be monitored in the same way.

Note that the delineation of the blocks in FIG. 2 and FIG. 3 is purely arbitrary. It is possible to move some of the blocks from one figure to the other without changing the operation of the multi output inverter as a whole. For instance, each DC to AC converter could have its own sine wave synthesis and PWM control signal generation block instead of one block controlling multiple DC to AC converters, in which case the block would naturally be shown in FIG. 2 instead of FIG. 3.

Figure 4:
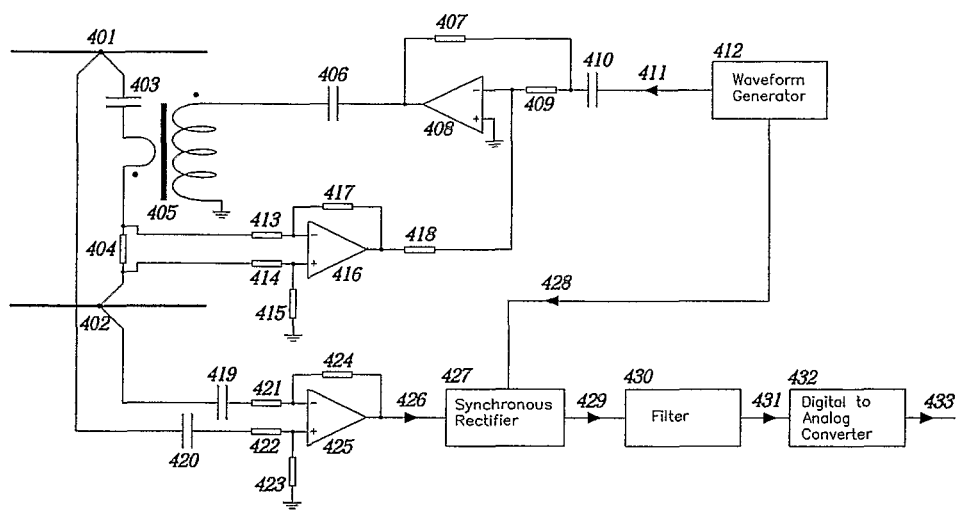
FIG. 4 shows a possible circuit for measuring the ESR (equivalent series resistance) of the energy store.

FIG. 4 shows one possible embodiment of a circuit adapted to measure the ESR of the long term DC energy store. Connection 401 is on one of the main DC supply conductors in the inverter and connection 402 is on the matching opposite polarity conductor. The waveform generator 412 produces an AC voltage of a suitable frequency and wave shape and applies it via connection 411; coupling capacitor 410 and resistor 409 to the amplifier 408. Resistor 407 provides a small amount of DC feedback to compensate for the amplifier's offset voltage. The amplifier drives the primary of transformer 405 through a coupling capacitor 406. The secondary of the transformer drives AC current into connections 401 and 402 through DC blocking capacitor 403 and current sense resistor 404. The voltage across the current sense resistor is amplified by the differential amplifier formed by amplifier 416 and resistors 413, 414, 415, and 417. The output of the differential amplifier is applied as negative feedback via resistor 418 to amplifier 408. The effect of the circuit described so far is to produce a current flow between connections 401 and 402 which is the same frequency and substantially the same shape as the AC voltage at connection 411. The conversion factor between the AC voltage and the resulting current is determined by the values of resistors 409 and 418, the value of the current sense resistor, and the gain of the differential amplifier.

The current flow between connections 401 and 402 will produce an AC voltage of a magnitude that will be related to the ESR of the long term DC energy store. This voltage passes through coupling capacitors 419 and 420 to a differential amplifier formed by amplifier 425 and resistors 421, 422, 423, and 424. The amplified AC voltage is passed by connection 426 to synchronous rectifier 427. The control signal 428 for the synchronous rectifier comes from the waveform generator and is in phase with the AC voltage produced by the waveform generator, and thus substantially in phase with the current injected at connection points 401 and 402. The synchronous rectifier will convert any AC voltage applied to its input which is at the same frequency as and in phase with its control signal to a signal at its output which will have an average DC value that is proportional to the magnitude of the applied AC voltage, but will also contain AC components at harmonics of the control signal frequency. Any component of the AC voltage applied to the input that has a phase shift of 90° in either direction with respect to the control signal will not contribute to the average DC value at the output of the rectifier. As a result, this average DC value will be proportional only to the resistive component of the impedance between connection 401 and 402. The ESR measurement will thus be unaffected by any inductive or capacitative component of the impedance. The output of the rectifier is passed via connection 429 to filter 430 where the AC components of the signal at harmonics of the control signal are removed, leaving a substantially pure DC voltage. From the filter the DC voltage passes via connection 431 to digital to analog converter 432. The digital representation of the DC voltage is made available via connection 433 to a processor external to the circuit which is thereby able to calculate a numerical value for the ESR of the long term DC energy store.

An Embodiment of a Poly-Phase Electric Motor Controller and its Method of Use

Figure 7:
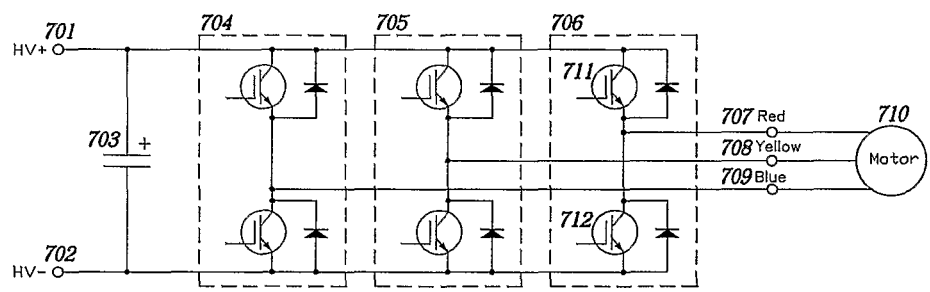
FIG. 7 shows a prior art motor speed controller.

FIG. 7 shows the output stages of a prior art motor speed controller for controlling a three phase motor 710. A high voltage DC supply from a preceding circuit (not shown) connects to terminals 701 and 702 and charges the high voltage bus capacitor 703. The capacitor 703 supplies high voltage DC power to three pulse width modulating (PWM) half bridge circuits 704, 705, and 706, which connect to phase terminals 707, 708, and 709. It is convention to label the phases in a three phase electrical system as red, yellow, and blue. Electrical connections are made between the motor controller phase terminals 707, 708, and 709 and the motor 710. Note that as a three phase motor is a balanced load there is no need for a neutral conductor in the electrical connections to the motor. Only the phase connections are required and for this reason motor speed controllers such as that shown in FIG. 7 do not generate a neutral voltage. A two phase motor is not a balanced load as the vector sum of its phase currents is not zero. Therefore a two phase motor requires a neutral connection and cannot be connected to a motor speed controller such as that shown in FIG. 7.

In a 230V 50 Hz mains electrical system the 230V part refers to the phase to neutral voltage and the phase to phase voltage is approximately 400V. In a 115V 60 Hz mains electrical system the phase to phase voltage is approximately 200V. Standard mains appliances are designed to be connected between the neutral of a mains electrical system and one of the phases and so should not be connected between two of the phase terminals of a motor speed controller. A PWM half bridge such as 706 produces rectangular output voltage pulses at a PWM frequency, which is normally in a range from 2 kHz to 100 kHz. The width of the pulses follows a sinusoidal pattern so as to produce the desired sine wave current in the motor windings. It is the inductance of the windings that converts the rectangular voltage pulses into a substantially smooth sine wave current. If a mains appliance was connected to the motor speed controller phase terminals, it is highly likely that the high frequency rectangular pulses would damage the appliance.

The PWM half bridge 706 comprises power switching devices 711 and 712. These are driven in a complementary manner so that for part of each PWM cycle device 711 is on and device 712 is off, and for the remainder of the cycle device 711 is off and device 712 is on. Half bridge 706 drives the red phase terminal 707. If a high positive voltage is required at the red phase terminal 707 then device 711 will be on for most of the PWM cycle. If a high negative voltage is required at the red phase terminal 707 then device 712 will be on for most of the PWM cycle. If zero voltage is required at the red phase terminal 707 then devices 711 and 712 will be on for equal times during the PWM cycle. The half bridge 705 controls the voltage at the yellow terminal 708 in the same manner, as does the half bridge 704 for the voltage at the blue terminal 709. Thus all six devices in the three half bridges 704, 705, and 706 are turned on and off once per PWM cycle and all incur switching losses and require gate drive power in order to produce the PWM output voltages. For a motor speed controller the power loss caused by the switching losses and gate drive power is not significant as normally the motor speed controller is only active when the motor needs to deliver power and the power loss is a small fraction of the power being consumed by the motor. This is not the case for a multi-output inverter of the type disclosed herein where the inverter operates continuously in order to provide un-interrupted mains power, but is often supplying no or a very small amount of power.

Figure 8:
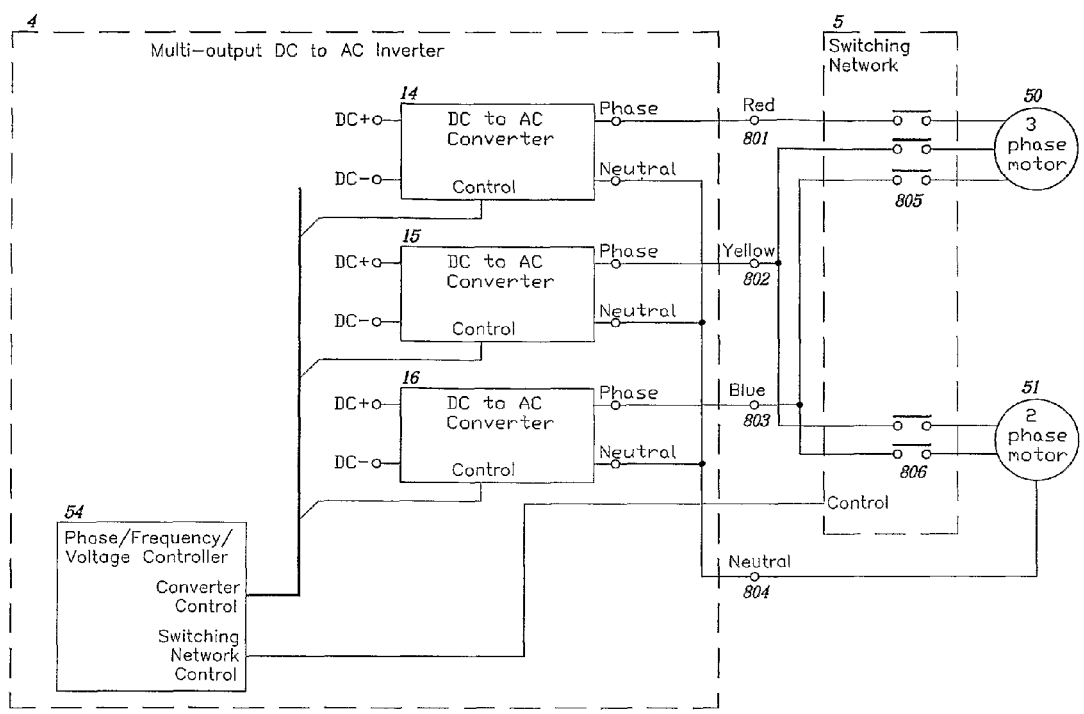
FIG. 8 shows a DC to AC inverter according to the invention operating two-phase and three-phase motors.

FIG. 8 shows a schematic view of one embodiment of a multi-output inverter and switching network constructed according to the principles disclosed herein. For clarity, FIG. 8 only shows those parts required to illustrate the motor speed controller aspects of the invention. Two poly-phase motors for connection to the multi-output inverter and switching network are shown by way of example.

The multi-output inverter 4 comprises a first DC to AC converter 14, a second DC to AC converter 15, a third DC to AC converter 16, and the phase/frequency/voltage controller 54. The phase AC output from the first DC to AC converter 14 connects to the red phase terminal 801, the phase AC output from the second DC to AC converter 15 connects to the yellow phase terminal 802, and the phase AC output from the third DC to AC converter 16 connects to the blue phase terminal 803. All the neutral AC outputs of the DC to AC converters 14, 15, 16 connect to the neutral terminal 804. The red 801, yellow 802, and blue 803 phase terminals are electrically connected to the three pole switch 805 in the switching network 5. The three phase electric motor 50 is also electrically connected to the three pole switch 805. The yellow 802 and blue 803 phase terminals are electrically connected to the two pole switch 806 in the switching network 5. The two phase electric motor 51 is electrically connected to the two pole switch 806 and to the neutral terminal 804.

The three phase motor 50 might, for example, drive the bow thruster of a boat and the two phase motor 51 might, for example, drive the water maker of a boat. A bow thruster will normally require a significantly more powerful motor than a water maker so that the power output of three DC to AC converter might be required by the bow thruster, while two DC to AC converters might be able to supply the power required by the water maker. In this example the direction and speed of the bow thruster motor might be controlled by a joystick or other similar user interface device (not shown in FIG. 8), and the water maker motor might be controlled by a simple on-off switch (also not shown).

When the boat's skipper uses the joystick to indicate that power should be applied to the bow thruster motor 50, the phase/frequency/voltage controller 54 is triggered to configure the multi-output DC to AC inverter 4 so that the DC to AC converters 14, 15, 16 are not being used for any other purpose, and to ensure that two pole switch 806 is open and three pole switch 805 is closed. The outputs of the DC to AC inverter are configured as described previously. For example, one or more loads on one or more outputs are consolidated onto one output to liberate the other outputs for motor control purposes. This process has been described above. Note, in FIG. 8, three DC to AC converters are shown for the motor control. Other converters could exist for supplying power to other consolidated loads, but have not been shown in FIG. 8 for clarity.

The phase/frequency/voltage controller 54 then configures the DC to AC converters 14, 15, 16 to produce three phase power with the red, yellow, and blue phase voltages having the same magnitude and a 120 degree phase difference between them. The phase/frequency/voltage controller 54 can then use any of the motor speed controller algorithms well known in the art to bring the speed and direction of the bow thruster motor 50 to the values that correspond to the joystick position. When the skipper finishes the bow thruster manoeuvre the phase/frequency/voltage controller 54 can open the three pole switch 805 and allocate the DC to AC converters 14, 15, 16 to other purposes, by reallocating other loads to unused outputs as described previously.

When the water maker on-off switch is turned on, the phase/frequency/voltage controller 54 is triggered to configure the multi-output DC to AC inverter 4 so that the DC to AC converters 15 and 16 are not being used for any other purpose (in a manner described previously), and must ensure that two pole switch 806 is closed and three pole switch 805 is open. The phase/frequency/voltage controller 54 then configures the DC to AC converters 15 and 16 to produce two phase power with the yellow and blue phase voltages having the same magnitude and a 90 degree phase difference between them. The phase/frequency/voltage controller 54 can then use any of the motor speed controller algorithms well known in the art to bring the speed of the water maker motor 51 up to its operational speed. The phase/frequency/voltage controller 54 is able to produce a smooth ramp up in speed in order to limit the current surge drawn from the DC supply and to limit the mechanical stress imposed on the components being driven by the motor 51. While the water maker motor 51 is being driven, the DC to AC converter 14 is free to be used for other purposes. This is a significant advantage that arises from the use of a two phase motor, and is particularly advantageous in the case of a water maker as water makers often run for several hours each day. When the water maker on-off switch is turned off, the phase/frequency/voltage controller 54 can open the two pole switch 806 and allocate the DC to AC converters 15 and 16 to other purposes, by reallocating other loads to unused outputs as described previously.

Note that a combination of three phase and two phase motors can be used if the device providing power to the motors has a neutral connection and is able generate 120 degree phase shifts as well as 90 degree phase shifts between phase voltages.

Figure 9:
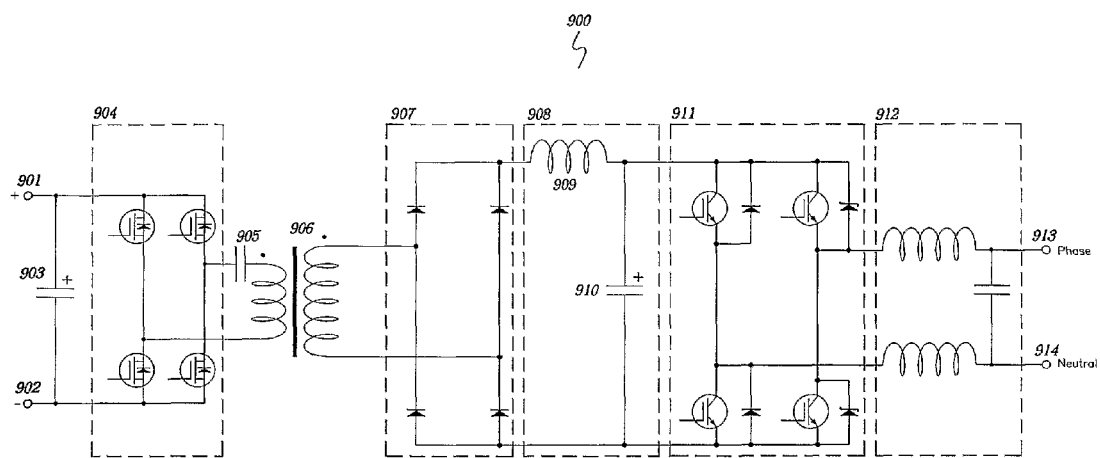
FIG. 9 shows a prior art DC to AC converter.

FIG. 9 shows a schematic diagram of a prior art DC to AC converter 900 representative of the most common commercially available converters with true sine wave output. Input terminals 901 and 902 are for connection of an external source of DC power. The capacitor or capacitor bank 903 provides local energy storage for supplying rapidly changing currents. The low voltage bridge switching circuit 904 generates rectangular AC voltage pulses from the voltage connected to terminals 901 and 901 and drives the low voltage winding of the transformer 906 with these AC pulses through the DC blocking capacitor 905. The high voltage winding of transformer 906 connects to the bridge rectifier 907. The bridge rectifier 907 converts the high voltage AC pulses produced by the high voltage winding of transformer 906 into high voltage positive voltages. The high voltage positive pulses produced by the bridge rectifier 907 are filtered into a substantially smooth high voltage DC supply by the filter 908 comprising the inductor 909 and the capacitor 910. The high voltage DC supply generated by the filter 908 is converted into a cycle of a series of voltage pulses by the PWM output bridge 911, where the cycle comprises a series of positive pulses of varying width followed by a series of negative pulses of varying width, the period of the cycle being equal to the period of a desired output sinusoidal voltage and the width of the pulses following a sinusoidal function. The series of voltage pulses produced by the PWM output bridge 911 are applied to the output filter 912 which converts them to a substantially smooth sinusoidal voltage at output phase terminal 913 and output neutral terminal 914.

The bridge rectifier 907 is able to transfer power from the transformer 906 to the filter 908, but not in the reverse direction. When the DC to AC converter shown in FIG. 9 is supplying power to a reactive load connected to the output phase terminal 913 and the output neutral terminal 914, then during some portions of the sine wave cycle the load will feed power back into the converter. As this power cannot pass back through the bridge rectifier 907 it is common practice to make the capacitor 910 in the filter 908 large enough to absorb this power while constraining the voltage of the high voltage DC supply to change by only a small amount. This is possible because the periods during the sine wave cycle when a reactive load feeds power back into the converter are short, typically less than 5 milliseconds for a 50 Hz or 60 Hz mains frequency sine wave. In a motor speed controller application, when the motor is being decelerated, the motor will feed power back into the motor speed controller. It is possible for this period of reverse power flow to last several seconds. There can also be periods of reverse power flow when the motor is running at a constant speed but is being mechanically driven by an external source of power. An example of this is the anchor winch of a boat. When the anchor is being lowered, the speed of the anchor winch motor will be set so that the anchor has a desired rate of descent. The weight of the anchor will try and accelerate the motor to a higher speed, effectively turning the motor into a generator and feeding power back into the motor speed controller. This period of reverse power flow into the motor speed controller could last for many tens of seconds. It is impracticable to make the filter capacitor 910 large enough to absorb reverse power flow for periods of several seconds or more. For this reason the DC to AC converter 900 is not suitable for use in a multi-output inverter designed to provide mains electrical power and to act as a motor speed controller.

Figure 10:
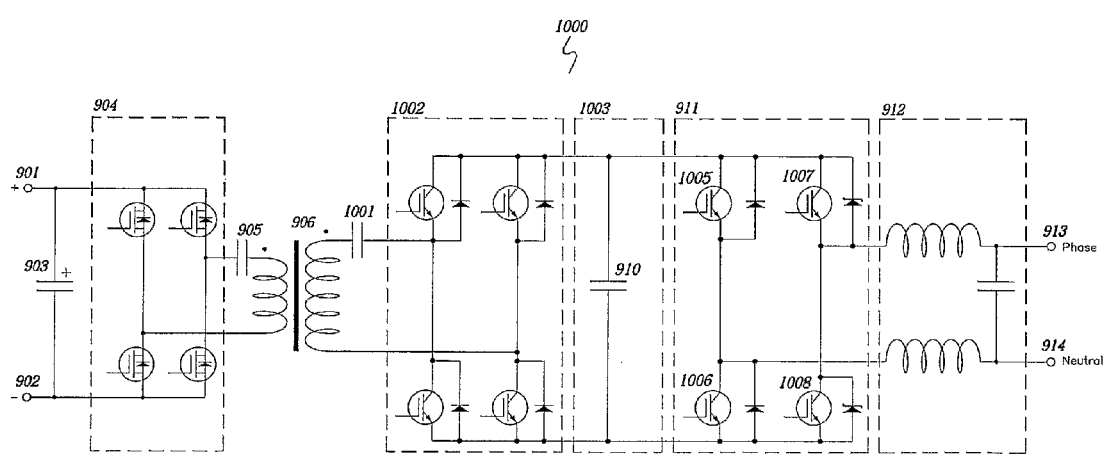
FIG. 10 shows a DC to AC converter adapted to supply mains power loads and operate poly-phase motors.

FIG. 10 shows a schematic diagram of one embodiment of a DC to AC converter 1000 suitable for use in a multi-output inverter designed to both provide mains electrical power and to act as a motor speed controller. Only the parts of the converter that are different to FIG. 9 will be described below.

In the bridge rectifier 1002, a power switch is connected across each diode in a manner that allows current to flow through the switch in the opposite direction to the forward conduction direction of the diode. The power switches are turned on and off in synchronism with the switches in the low voltage bridge switching circuit 904 so that the bridge rectifier 1002 still converts the high voltage AC pulses produced by the high voltage winding of transformer 906 into high voltage positive voltages, but also allows power to flow from the output of the bridge rectifier 1002 through the transformer 906 and the low voltage bridge switching circuit 904 into the capacitor 903 and into the external source of DC power connected to the input terminals 901 and 902. The bridge rectifier 1002 is of a type known to those skilled in the art as an active rectifier. The capacitor 1001 performs a DC blocking function when power is being transferred in reverse through the bridge rectifier 1002.

As power that is fed back into the output phase terminal 913 and the output neutral terminal 914 is able to be transferred back to the capacitor 903 and into the external source of DC power connected to the input terminals 901 and 902, there is no longer a requirement for the capacitor 910 to have a large value. A smaller, lower cost capacitor can be used, and it is also possible to eliminate the inductor 909 from the high voltage filter and use just the leakage inductance of the transformer 906 to limit the charging current into the capacitor 910 when the DC to AC converter 1000 is powered on.

The PWM output bridge 911 resembles two of the half bridge circuits shown in FIG. 7 and it is possible to drive the switching devices 1005-1008 in the same manner as described for FIG. 7, so as to produce the train of rectangular pulses that are fed to the output filter 912. However, if the PWM technique described for FIG. 7 is used then all four switching devices 1005-1008 would be switched on and off once per PWM cycle and all four would incur switching losses and require gate drive power. This is undesirable in a DC to AC converter intended to be run continuously. There is an alternative PWM method which results in a smaller switching loss and a lower gate drive power. This is to use one half bridge circuit to define the width of the rectangular pulses and the other half bridge circuit to define their polarity. The polarity defining half bridge then only switches at the sine wave frequency and not at the much higher PWM frequency, and therefore has virtually zero switching losses and a much reduced gate drive power requirement. In the PWM output bridge 911 the polarity defining half bridge comprises power switching devices 1005 and 1006. The PWM half bridge comprises power switching devices 1007 and 1008. To produce the positive half cycle of the output sine wave, device 1006 is switched on and device 1005 is switched off while devices 1007 and 1008 are switched on and off at the PWM frequency to produce rectangular pulses whose width follows a sinusoidal function. At the highest voltage point of the positive half cycle, device 1007 is on for most of the PWM cycle. At the zero voltage points of the positive half cycle, device 1007 should be off continuously and device 1008 should be on continuously. To produce the negative half cycle, device 1006 is switched off and device 1005 is switched on while devices 1007 and 1008 continue to perform their PWM function. At the most negative voltage point of the negative half cycle, device 1008 is on for most of the PWM cycle. At the zero voltage points of the negative half cycle, device 1008 should be off continuously and device 1007 should be on continuously.

The polarity defining switches 1005 and 1006 are switched on and off at the sine wave frequency, which is 50 Hz or 60 Hz for mains power applications. This requires that each device be turned on for 10 or 8.3 milliseconds and then be turned off for the same length of time. These time intervals are much longer than can be handled by conventional gate drive transformers. One technique well known to those skilled in the art for driving the gate of a power switching device at these frequencies is to pass a high frequency AC signal through a gate drive transformer and rectify it to produce the gate drive voltage. The AC signal is turned on when the switching device needs to be on and is turned off when the switching device needs to be off. It is common to use the rectified voltage to charge a capacitor so that the stored energy in the capacitor can be used to rapidly turn on the switching device each time the AC signal is turned on. In order for this to work, the charge on the capacitor must be retained for the duration of the period when the AC signal is turned off, which is a maximum of 10 milliseconds for a mains power application. A motor speed controller will often be called upon to produce a sine wave output at a frequency as low as 1 Hz. Thus a DC to AC converter that is designed to both produce mains power and also to act as a motor speed controller must be able to retain the charge on the capacitor for up to 50 times longer than a converter intended for just mains power applications. This requires very careful design of the gate drive circuit.

The PWM power switching devices 1007 and 1008 consume significant gate drive power. It is desirable to minimise this power as much as possible as it constitutes an appreciable fraction of the converter's no-load power consumption. For instance, the gate drive circuit disclosed in PCT application PCT/NZ2007/000381 by the same inventor could be used in order to reduce the gate drive power required. This circuit uses a resonant gate drive technique to produce voltage transitions at the gate of the power switching device. Between transitions the gate voltage is maintained by the gate capacitance of the power switching device. This resonant method of producing a gate drive transition sets a minimum time between one transition and the next, which has the effect of making it impossible for the PWM power switching devices 1007 and 1008 to produce arbitrarily narrow rectangular pulses when the required sine wave voltage is close to zero. As a solution to this problem the inventor has developed a technique of using pulse density modulation instead of pulse width modulation whenever the required pulse width is narrower than a predefined value. When pulse density modulation is being used, all the rectangular pulses are the same width, but no pulse is produced for some of the PWM cycles so that the average voltage of the rectangular pulse train follows the required sinusoidal voltage. For example, if a 230V 50 Hz mains voltage is being produced at a PWM frequency of 45 kHz and the minimum pulse width is 750 nanoseconds, then pulse density modulation needs to be used whenever the sine wave voltage is within about 150 microseconds of a zero crossing.

The pulse density modulation technique works well for producing mains frequency sine waves, but runs into a problem when used at lower frequencies in motor speed controller applications. At low frequencies the voltage applied to a motor's windings must be reduced to prevent saturation of the magnetic circuit of the motor. A combination of low frequency and low voltage means that the DC to AC converter will stay in the pulse density modulation mode for most of the sine wave cycle, and for much of this time many of the PWM cycles will not produce a rectangular pulse. Under these conditions it is possible that there will be no voltage transitions at the gates of power switching devices 1007 and 1008 for a significant number of PWM cycles, and that the gate capacitance of the power switching devices may not be sufficient to maintain the gate voltages between transitions. The inventor has determined that under these conditions it is possible to generate occasional short rectangular pulses without in practice degrading the waveforms applied to the motor. For example, a monitoring circuit can be added to the pulse density modulator so that if no rectangular pulse has been produced in the last 1 millisecond then the monitoring circuit can cause a 200 nanosecond long pulse to be produced. This will refresh the charge stored in the gate capacitance of the power switching devices 1007 and 1008 before it has a chance to drain away.

Figure 11:
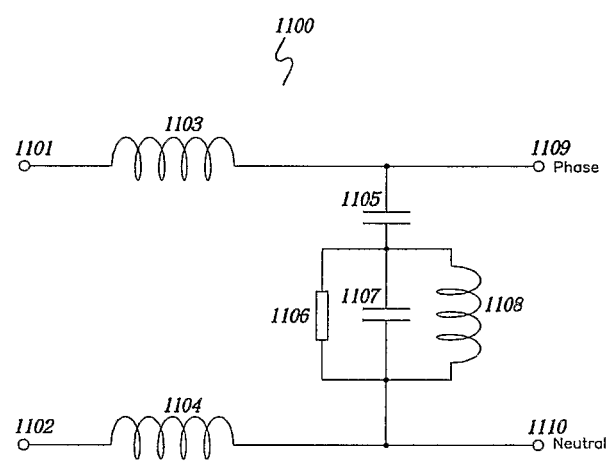
FIG. 11 shows a damped filter for use with the DC to AC converter.

The output filter 9'12 shown in FIGS. 9 and 10 has been drawn in a simplified form. This simplified filter would work, provided that the current drawn out of it has a sinusoidal waveform. However, some loads such as microwave ovens and motors with magnetic circuits approaching saturation do not draw sinusoidal currents even though they are supplied with sinusoidal voltages. Non sinusoidal currents would excite the series resonance of the inductors and capacitor in the filter 912, causing an oscillation at the series resonant frequency to be superimposed on the output sine wave voltage. One embodiment of a filter with damping of the series resonance is shown in schematic form in FIG. 11. The filter 1100 comprises input terminals 1101 and 1102 for receiving a pulse width or pulse density modulated pulse train, series inductors 1103 and 1104, a main filter capacitor 1105, an output phase terminal 1109, an output neutral terminal 1110, and a damping circuit comprising a resistor 1106, a capacitor 1107, and an inductor 1108. The values of the components in the filter 1100 are selected so that the capacitor 1107 and the inductor 1108 have the same parallel resonant frequency as the series resonant frequency of the combination of the inductor 1103, the capacitor 1105, and the inductor 1104. At the series resonant frequency the parallel resonance of the capacitor 1107 and the inductor 1108 effectively removes these components from the circuit and the resistor 1106 becomes part of the series circuit so that it damps the series resonance. At the sine wave frequency the inductor 1108 provides a low impedance path in parallel with the resistor 1106 so that most of the current flows through the inductor 1108 and the resistor 1106 dissipates very little power. At the PWM frequency the capacitor 1107 provides a low impedance path in parallel with the resistor 1106 so that most of the current flows through the capacitor 1107 and the resistor 1106 dissipates very little power.

In one embodiment of the filter 1100 the component values might be: 1 milliHenrey for the inductors 1103 and 1104, 10 microFarad for the capacitor 1105, 47 microFarad for the capacitor 1107, 426 microHenrey for the inductor 1108, and 14 Ohms for the resistor 1106. These values give a series resonant frequency of 1125 Hz. If the filter 1100 is part of a DC to AC converter being used to drive a poly-phase electric motor, then, as the motor speed is ramped up from zero towards its maximum speed, various odd harmonics of the sine wave frequency will excite the series resonance. For example, the fifth harmonic of 225 Hz and the third harmonic of 375 HZ will both excite the series resonance. Thus the damping resistor 1106 is required for both mains power and motor speed controller applications of the DC to AC converter. Once the motor drive sine wave is above 375 Hz the damping resistor is no longer required as there is no odd harmonic smaller than the third. However, at these higher frequencies significant amounts of current at the fundamental sine wave frequency will flow in the resistor 1106, causing a high power dissipation in the resistor. Note that it is desirable to be able to drive high frequency poly-phase electric motors as these weigh less than lower frequency motors of the same power rating. For instance, a 1 kW 800 Hz motor might weigh 0.75 kg and a 1 kW 50 Hz motor might weigh 15 kg.

Figure 12:
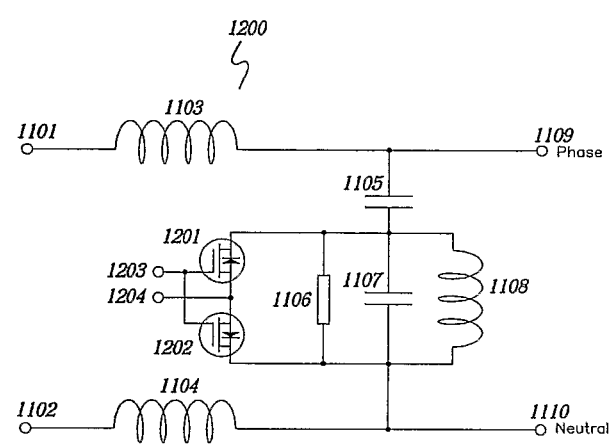
FIG. 12 shows a filter suitable for DC to AC converters designed to both produce mains power and to drive high frequency poly-phase electric motors.

FIG. 12 shows a schematic diagram of a filter 1200 which is suitable for DC to AC converters designed to both produce Mains power and to drive high frequency poly-phase electric motors. The filter 1200 is identical to the filter 1100 except for the addition of the MOSFETS 1201 and 1202 which are connected in series across the damping resistor 1106. A gate drive terminal 1203 is electrically connected to the gates of both MOSFETS 1201, 1202 and a source reference terminal 1204 is electrically connected to the source of both MOSFETS 1201, 1202. When the potential difference from the source reference terminal 1204 to the gate drive terminal 1204 is zero or negative, both MOSFETS 1201, 1202 will be off and will not influence the current flow through the damping resistor 1106. When the potential difference from the source reference terminal 1204 to the gate drive terminal 1204 is sufficiently positive, both MOSFETS 1201, 1202 will be on and current that would otherwise have flowed through the damping resistor 1106 will now flow through the MOSFETS 1201, 1202. As the on resistance of the MOSFETS 1201, 1202 is much less than the resistance of the damping resistor 1106, much less power will be dissipated when the MOSFETS 1201, 1202 are turned on. In use, the MOSFETS 1201, 1202 would be turned on once the sine wave frequency exceeds one third of the series resonant frequency.

Figure 13:
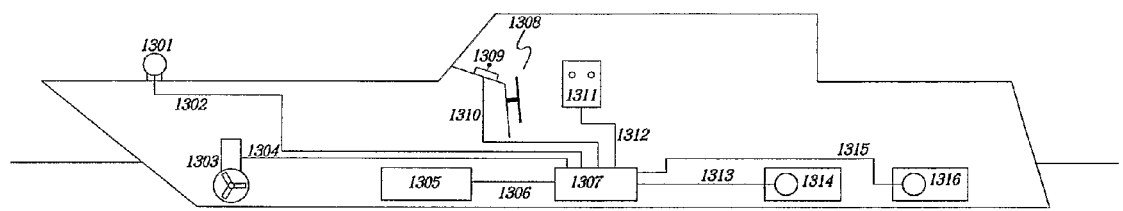
FIG. 13 shows a vessel with various poly-phase motors operated by a DC to AC inverter according to the present invention.

FIG. 13 shows a simplified schematic diagram of one embodiment of a vessel equipped with a multi-output inverter constructed according to the embodiments disclosed herein. The diagram shows only those parts of the power system associated with motor driven equipment in the vessel. These comprise: an anchor winch 1301 comprising a two phase motor, a power cable 1302 connected between the anchor winch 1301 and the multi-output inverter 1307, a bow thruster 1303 comprising a three phase motor, a power cable 1304 connected between the bow thruster 1303 and the multi-output inverter 1307, a battery bank 1305, a power cable 1306 connected between the battery bank 1305 and the multi-output inverter 1307, a multi-output inverter 1307, a steering station 1308, a joystick assembly 1309 for controlling the anchor winch 1301 and the bow thruster 1303, a signal cable 1310 connected between the joystick assembly 1309 and the multi-output inverter 1307, an electrical control panel 1311 comprising an on-off switch for the water maker 1314 and an on-off switch for the scuba compressor 1316, a signal cable 1312 connected between the control panel 1311 and the multi-output inverter 1307, a power cable 1313 connected between the multi-output inverter 1307 and the water maker 1314, a water maker 1314 comprising a two phase motor, a power cable 1315 connected between the multi-output inverter 1307 and the scuba compressor 1316, and a scuba compressor 1316 comprising a two phase motor.

To minimise the cost of the multi-output inverter 1307 it should comprise the minimum number of output channels required to power the equipment in the vessel. For example, the multi-output inverter 1307 might have four output channels. These could be allocated for differing purposed depending on what pieces of equipment require power. Either one, two, three, or four output channels could be allocated to provide mains power, with the un-allocated output channels shut down, or one output channel could be allocated to provide mains power and the other three could be allocated to act as a three phase motor speed controller, or one or two of the output channels could be allocated to provide mains power and two of the output channels could be allocated to act as a two phase motor speed controller. Many vessels are now designed on the assumption that there will be a continuous source of mains power, so at least one output channel should be allocated to produce mains power at all times. This means that a four output inverter is capable of providing one motor speed controller function at any one time.

As there are a number of pieces of equipment in the vessel that need to receive power from a motor speed controller, the use of these pieces of equipment needs to be prioritised. For example, the anchor is a vital piece of safety equipment, so the anchor winch should have the highest priority. The bow thruster is used for manoeuvring the vessel so it should have the next priority. The priorities of the water maker and scuba compressor will depend on conditions on board the vessel at the time so the crew should be able to choose which one should run. Note that if the water maker and scuba compressor are designed to run at the same motor speed, then it would be possible to run these both at the same time from the one motor speed controller.

Figure 14:
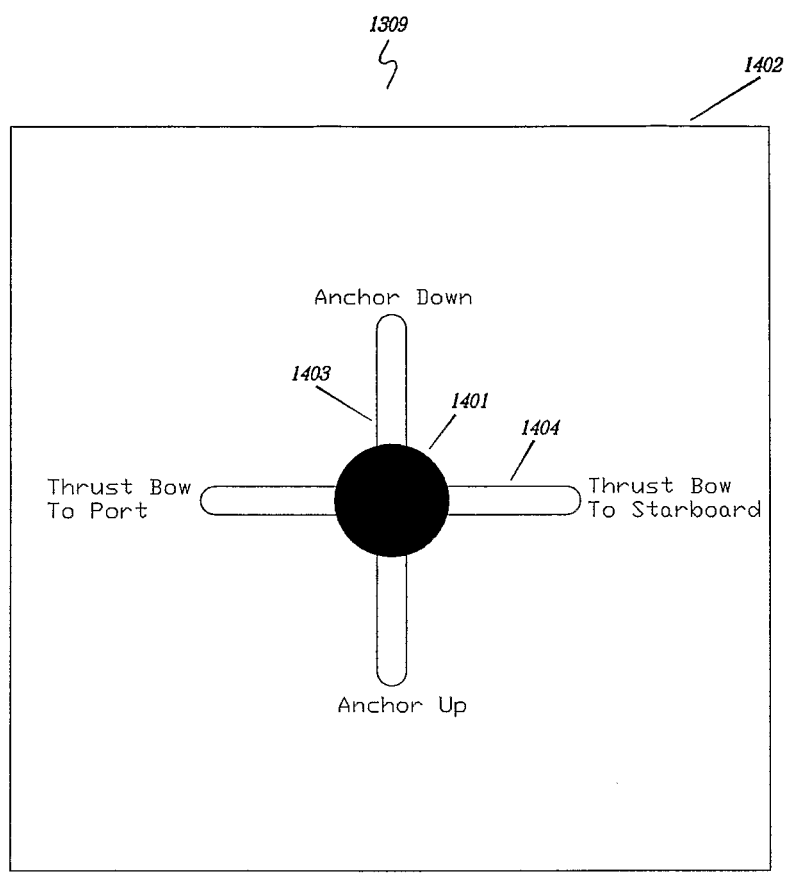
FIG. 14 shows a control stick for operating an anchor and bow thruster of a vessel.

FIG. 14 shows a plan view of one embodiment of the joystick assembly 1309. The joystick assembly 1309 comprises a joystick knob 1401, a plate 1402, a vertical slot 1403 formed in the plate 1402, and a horizontal slot 1404 formed in the plate 1402. A joystick shaft not visible in this plan view extends through the slots in the plate 1402 and links the joystick knob 1401 to the joystick position sensing mechanism, also not visible, located below the plate 1402. The slots 1403 and 1404 constrain the joystick knob 1401 to move either vertically or horizontally, but prevent it from being moved in both these directions at the same time.

When the skipper moves the joystick up or down the vertical slot the inverter is triggered to configure itself to drive the two phase motor in the anchor winch and control the speed of this motor in proportion to the amount the joystick is moved. When the skipper moves the joystick left or right in the horizontal slot the inverter is triggered to configure itself to drive the three phase motor in the bow thruster and control the speed of this motor in proportion to the amount the joystick is moved. Note that configuring the inverter to act as a motor speed controller may involve first freeing up output channels being used to provide mains power by transferring the mains appliances to other channels, or by disconnecting the mains appliances if it is not essential that they have a continuous source of power. Configuring the inverter may also involve freeing up channels by shutting down equipment such as the water maker or scuba compressor which could be utilising two or more channels acting as a motor speed controller.

In deep water it may take several minutes to raise or lower the anchor. During this time it is important that the vessel is positioned with its bow facing into the waves. Thus it is necessary to periodically interrupt the raising or lowering operation to correct the vessel's orientation using the bow thruster. The skipper's attention should be concentrated on the operation of the vessel without any unnecessary distractions, so it is essential that the frequent reconfiguring of the inverter takes place rapidly and completely automatically.

The invention claimed is:

1. A DC to AC inverter comprising:
   two or more DC to AC converters that provide a plurality of output channels,
   a DC input for coupling to a long term DC energy store, and
   at least one mains frequency phase controller or a phase controller input for coupling to at least one phase controller,
   wherein:
   the inverter draws a DC input current from the long term DC energy store coupled to the DC input and generates AC output voltages on the output channels that have a frequency and amplitude for supplying a single phase mains powered apparatus, and
   the at least one phase controller dynamically controls the phase of the AC output voltages independently by:
   receiving input indicating the magnitude and phase of the AC component of current supplied to or drawn from the output channels, and altering the phase of the AC output voltage or voltages on one or more output channels of the DC to AC inverter based on the indicated magnitude and phase of the AC component of current supplied to or drawn from one or more of the output channels to reduce mains frequency ripple current drawn from the long term DC energy store coupled to the DC input.

2. A DC to AC inverter according to claim 1 wherein there are at least two phase controller inputs for coupling to at least two phase controllers or at least two phase controllers that communicate with each other so as to receive at least input derived from the magnitude and phase of the AC component of current supplied to or drawn from the output channels, wherein the phase controllers alter the phase of the AC output voltage or voltages on one or more output channels of the DC to AC inverter based on the received input.

3. A DC to AC inverter according to claim 1 wherein the DC to AC inverter comprises the one or more phase controllers in the same enclosure.

4. A DC to AC inverter according to claim 1 comprising an output for connection to a switching network with a plurality of load outputs for connection to one or more loads, the switching network being configurable to selectively connect one or more of the output channels to one or more of the load outputs.

5. A DC to AC inverter according to claim 1 further comprising a switching network with a plurality of load outputs for connection to one or more loads, the switching network being configurable to selectively connect one or more of the output channels to one or more of the load outputs.

6. A DC to AC inverter according to claim 4 or 5 wherein the switching network is configured to selectively connect at least one of the output channels to two or more load outputs of the switching network, each load output being for connection to one or more loads,
   wherein for each of one or more original output channels the DC to AC inverter further comprises:
   one or more sensors coupled to detect the magnitude of the current supplied to or drawn from the original output channel,
   wherein when the switching network is configured for connecting the original output channel to two or more load outputs, the one or more phase controllers being coupled to receive input from the one or more sensors and upon receiving input indicating a high current being supplied to or drawn from the original output channel, the one or more phase controllers:
   activate one or more of the other output channels,
   align the phases of the AC voltage on the one or more other output channels and the original output channel,
   operate the switching network into a configuration for connecting the one or more other output channels to one or more load outputs supplied by the original output channel, and
   disconnect the one or more load outputs from the original channel.

7. A DC to AC inverter according to claim 4 or 5 wherein the switching network is configured to selectively connect at least one of the output channels to two or more load outputs of the switching network, each load output being for connection to one or more loads,
   wherein the switching network comprises:
   one or more sensors coupled to detect the current magnitude drawn from one or more load outputs of the switching network, and
   upon receiving input indicating a high current being drawn from a load output of the switching network being supplied by an original output channel, the one or more phase controllers:
   activate another output channel,
   align the phases of the AC voltage on the other output channel and the original output channel, operate the switching network into a configuration for connecting the load output to the other channel, and
disconnect the load output from the original channel.

8. A DC to AC inverter according to claim 4 or 5 wherein the switching network is configured to selectively connect at least one of the output channels to one or more load outputs of the switching network, each load output being for connection to one or more loads, wherein for each of one or more original output channels the DC to AC inverter further comprises:

one or more sensors coupled to detect the magnitude of current being supplied to or drawn from an original output channel, wherein when the switching network is configured for connecting the original output channel to one or more load outputs of the switching network, the one or more phase controllers:

receive input from the one or more sensors, and upon receiving input indicating a low current being drawn from the original output channel, align the phases of the original output channel and a consolidated output channel, operate the switching network into a configuration to connect the one or more load outputs of the switching network being supplied by the original output channel to the consolidated output channel, disconnect the original output channel from the one or more load outputs, and shut down the DC to AC converter supplying the original output channel.

9. A DC to AC inverter according to claim 4 or 5 wherein the switching network is configured to selectively connect at least one of the output channels to one or more load outputs of the switching network, each load output being for connection to one or more loads, wherein the switching network further comprises:

one or more sensors coupled to detect the magnitude of current being drawn from one or more load outputs of the switching network, wherein when the switching network is configured for connecting an original output channel to one or more load outputs of the switching network, the one or more phase controllers:

receive input from the one or more sensors, and upon receiving input indicating a low total current being drawn from all the load outputs being supplied from the original output channel, align the phases of the original output channel and a consolidated output channel, operate the switching network into a configuration to connect all the load outputs of the switching network being supplied by the original output channel to the consolidated output channel, disconnect the original output channel from all the load outputs it had been supplying, and shut down the DC to AC converter supplying the original output channel.

* * * * *

UNITED STATES PATENT AND TRADEMARK OFFICE
CERTIFICATE OF CORRECTION

PATENT NO.       : 8,456,128 B2
APPLICATION NO.  : 12/667773
DATED            : June 4, 2013
INVENTOR(S)      : Christopher William Fotherby Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 420 days.

Signed and Sealed this
Eighth Day of September, 2015

Michelle K. Lee
*Director of the United States Patent and Trademark Office*